United States Patent
Kasen et al.

[11] Patent Number: 6,158,081
[45] Date of Patent: *Dec. 12, 2000

[54] WATER EXTRACTION CLEANING MACHINE WITH VARIABLE SOLUTION MIXING VALVE

[75] Inventors: Timothy E. Kasen, Jenison; Charles A. Reed, Jr., Rockford; Eric C. Huffman, Lowell, all of Mich.

[73] Assignee: Bissell Homecare, Inc., Grand Rapids, Mich.

[ * ] Notice: This patent is subject to a terminal disclaimer.

[21] Appl. No.: 09/139,963

[22] Filed: Aug. 25, 1998

Related U.S. Application Data

[63] Continuation-in-part of application No. 08/743,844, Nov. 5, 1996, Pat. No. 5,937,475
[60] Provisional application No. 60/075,924, Feb. 25, 1998, provisional application No. 60/007,289, Nov. 6, 1995, provisional application No. 60/006,665, Nov. 13, 1995, provisional application No. 60/017,175, May 9, 1996, and provisional application No. 60/026,988, Sep. 20, 1996.

[51] Int. Cl.[7] ........................................... A47L 7/00
[52] U.S. Cl. ................................. 15/320; 15/321
[58] Field of Search ....................... 15/320, 321

[56] References Cited

U.S. PATENT DOCUMENTS

| | | |
|---|---|---|
| 2,980,392 | 4/1961 | Greenwood . |
| 3,240,230 | 3/1966 | Callahan, Jr. et al. . |
| 3,410,521 | 11/1968 | Sowers, III et al. . |
| 3,940,826 | 3/1976 | Phillips et al. . |
| 4,157,808 | 6/1979 | Eidsmore . |
| 4,458,377 | 7/1984 | Frohbieter . |
| 4,498,214 | 2/1985 | Oxel . |
| 4,558,823 | 12/1985 | Groth . |
| 4,570,856 | 2/1986 | Groth et al. . |
| 4,575,007 | 3/1986 | Groth et al. . |
| 4,676,287 | 6/1987 | Fitzwater . |
| 4,809,397 | 3/1989 | Jacobs et al. . |
| 4,845,802 | 7/1989 | Miller et al. . |
| 4,881,288 | 11/1989 | May et al. . |
| 4,938,421 | 7/1990 | Berfield et al. . |
| 4,956,891 | 9/1990 | Wulff . |
| 5,180,439 | 1/1993 | Allison . |
| 5,331,713 | 7/1994 | Tipton . |
| 5,398,567 | 3/1995 | Specht . |
| 5,406,673 | 4/1995 | Bradd et al. . |
| 5,937,475 | 8/1999 | Kasen et al. .............................. 15/320 |

*Primary Examiner*—Bibhu Mohanty
*Attorney, Agent, or Firm*—Rader, Fishman, Grauer & Mc Garry, an office of Rader, Fishman & Grauer PLLC

[57] ABSTRACT

The invention relates to a water extraction cleaning machine having a variable solution mixing valve adapted to create cleaning solution mixtures of variable constituent ratios. Clean water and detergent are provided from tanks supported on the water extraction cleaning machines. The size of the detergent inlet opening can be altered through rotation of a control knob provided on the outside of the water extraction cleaning machine. The knob is interconnected to at least one member which is adapted to vary the size of one of the detergent fluid inlet and the clean water inlet so that the ratio of constituent elements can be altered depending upon the cleaning application.

21 Claims, 16 Drawing Sheets

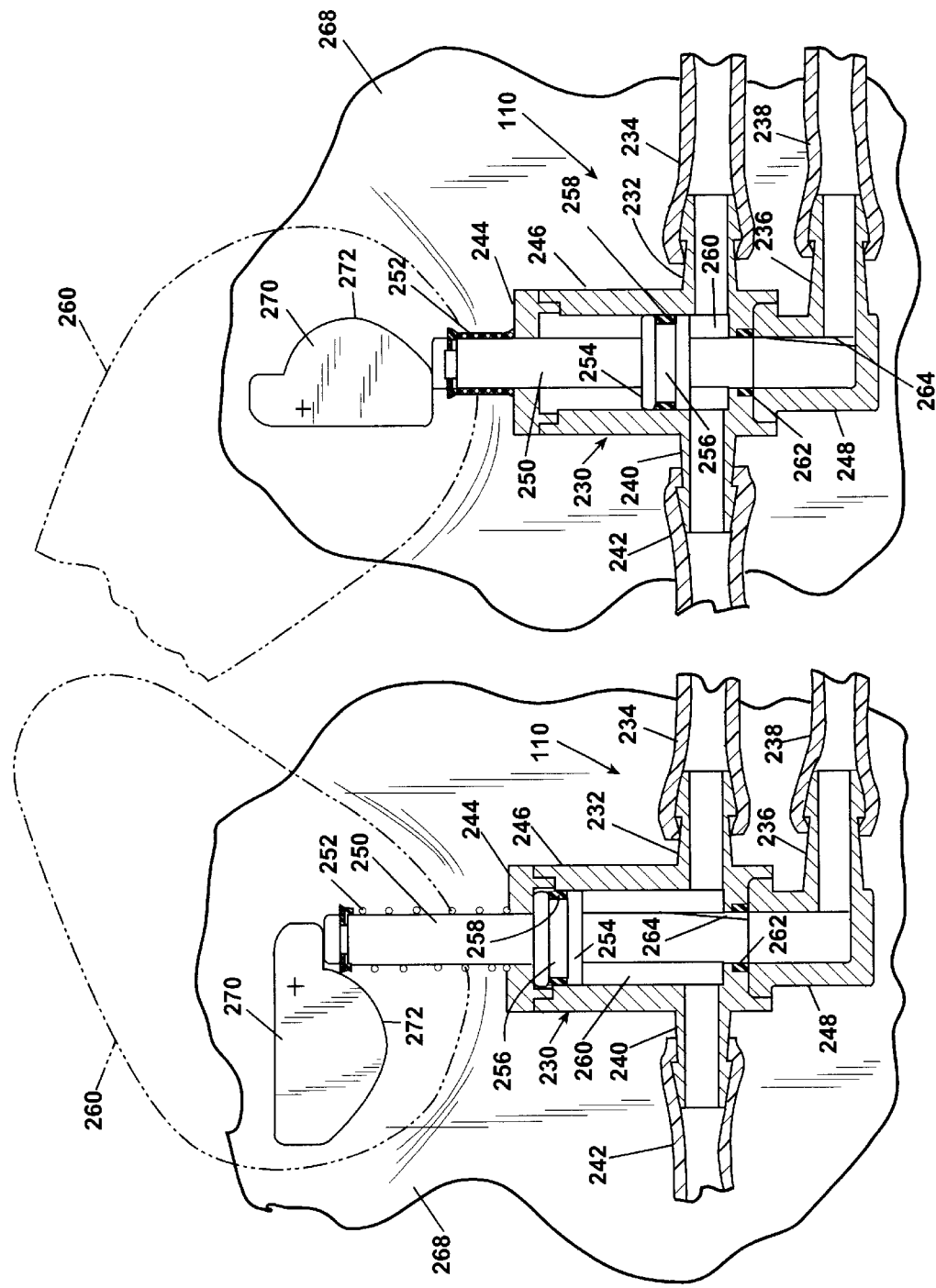

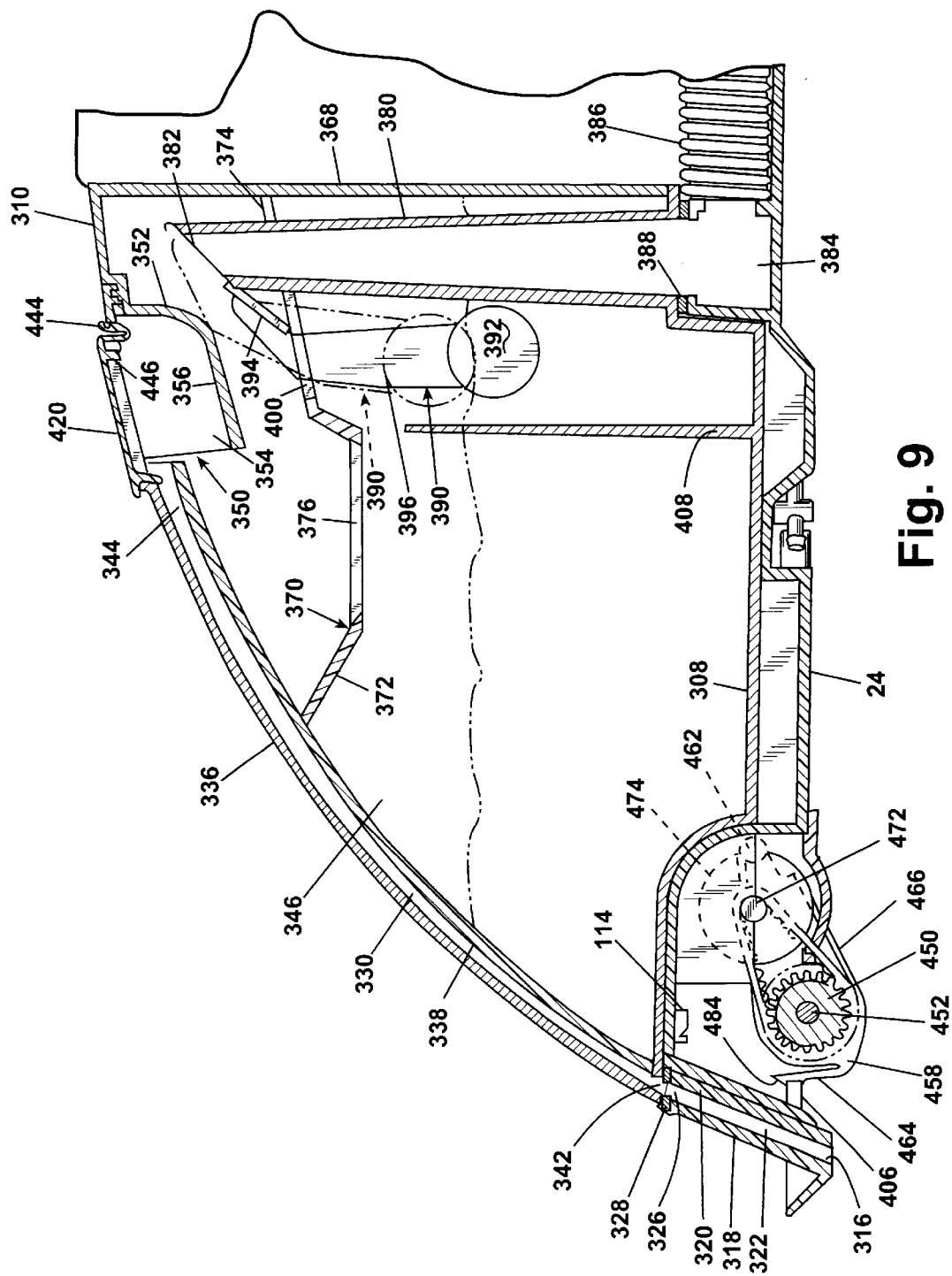

WATER EXTRACTION CLEANING MACHINE WITH VARIABLE SOLUTION MIXING VALVE

CROSS-REFERENCE TO RELATED APPLICATIONS

This application is a continuation in part of U.S. patent application Ser. No. 08/743,844, filed Nov. 5, 1996, now U.S. Pat. No. 5,937,475, and claims the benefit of U.S. provisional patent applications Ser. No. 60/075,924, filed Feb. 25, 1998; Ser. No. 60/007,289, filed Nov. 6, 1995; Ser. No. 60/006,665, filed Nov. 13, 1995; Ser. No. 60/017,175 filed May 9, 1996; and Ser. No. 60/026,988 filed Sep. 20, 1996.

BACKGROUND OF THE INVENTION

1. Field of the Invention

This invention relates to cleaning machines and, more particularly, to a water extraction cleaning machine having a mixing valve adapted to create cleaning solution mixtures of variable constituent ratios.

2. Description of the Related Art

Water extraction cleaning machines have long been used for removing dirt from surfaces such as carpeting, upholstery, drapes, and the like. The known water extraction cleaning machines can be in the form of a canister type unit as seen in U.S. Pat. No. 5,237,720 to Blase et al. or an upright unit as seen in U.S. Pat. No. 5,500,977 to McAllise et al. and U.S. Pat. No. 4,559,665 to Fitzwater. The current water extraction cleaners can be difficult to use and often have limited adaptability for a variety of cleaning conditions. For example, none of the known water extraction cleaners provide means for quickly and efficiently varying the mixture ratio of detergent and water. In addition, none of the known upright water extraction cleaners provide means for automatic adjustment of the height of the roller-type agitation brush in response to changes on the surface being cleaned. Another problem inherent with the known water extraction cleaners is ease of use in filling and emptying the clean water tank and recovery tank. Finally, none of the known prior art water extraction cleaners incorporate means for quickly and easily converting between on-the-floor cleaning, and off-the-floor cleaning with an accessory hose and cleaning tool.

The Frohbieter U.S. Pat. No. 4,458,377 (issued Jul. 10, 1984) discloses a wet carpet cleaning apparatus wherein a fluid delivery system has a valve structure for delivering a detergent/water solution to nozzles for spraying the carpet. The valve is controllable so that it can be shut off, it can spray only water, or it can spray a low-detergent/water combination or a high-detergent/water combination. The valve includes an elongated hollow body with two spaced inlets, one for detergent and one for water. A slidable valve member has a series of o-rings which, in selected positions, block the flow of water through the valve, block the flow of detergent through the valve, or open the valve only for the flow of water, or open the valve for flow of a mixture of water and detergent. Water is supplied to the cleaning equipment through a hose connected to a domestic faucet.

U.S. Pat. No. 4,570,856 to Groth et al. (issued Feb. 18, 1986) describes an upright deep cleaning machine including means for mixing water and detergent concentrate. Water and detergent are drawn from their respective containers by vacuum suction generated by the vacuum motor, and separately enter a mixing valve with V-shaped passageways converging to mix the fluids prior to distribution onto the surface to be cleaned. A rocker arm is interconnected to a finger trigger for initially controlling the distribution of a predefined mixture of water and detergent onto the surface to be cleaned. Further articulation of the trigger results in varying the mixture to increase the level of detergent concentrate by restricting the water conduit upstream from the V-shaped mixing valve.

The Phillips et al. U.S. Pat. No. 3,940,826 (issued Mar. 2, 1976), shows a water extraction cleaner wherein pressurized water is supplied through a hose from an external source to a floor nozzle through a venturi-type injection valve, which includes a spring-biased ball in a valve chamber. A source of cleaning solution concentrate is connected to the injection valve. The flow of the cleaning solution concentrate to the injection valve is controlled by a metering valve with an adjusting knob on a handle. As long as the force of the water pressure is greater than the force of the spring biasing the ball, the ball is unseated to allow cleaning solution concentrate to be drawn into the stream of pressurized water.

SUMMARY OF THE INVENTION

The water extraction cleaner according to the invention has a variable solution mixing valve adapted to create cleaning solution mixtures of variable constituent ratios. In one aspect of the invention, the variable solution mixing valve comprises a variable detergent/water mixing valve including a body forming a detergent/water mixing chamber. A clean water inlet port in the body fluidly connects the mixing chamber to the clean water tank and a detergent inlet port in the body fluidly connects the detergent tank to the mixing chamber. A solution outlet port in the body fluidly connects the mixing chamber to at least one spray nozzle. The variable detergent/water mixing valve further includes a variable flow rate valve mounted in the body and movably associated with the clean water port or the detergent inlet port for varying the relative proportions of the clean water and detergent delivered to the solution outlet port. An actuating knob mounted to an exterior wall of the extraction cleaner housing moves about an axis generally perpendicular to the exterior wall and is coupled to the variable flow rate valve through a mechanical connector for movement therewith.

In another embodiment, the variable detergent/water mixing valve comprises an actuating knob mounted to the housing on the exterior wall for rotational movement and coupled to the variable flow rate valve through a threaded mechanical connector for movement therewith.

In a further embodiment, the variable detergent/water mixing valve includes a shaft mounted in the detergent inlet port for axial movement therein. The shaft includes a longitudinal variable flow rate groove therein and, via the relative position of the variable flow rate groove within the detergent inlet port, is adapted to control the flow rate of detergent to the mixing chamber through the inlet port into the mixing chamber.

In still another embodiment of the invention, the shaft has a flow regulation disk mounted thereon. The disk has a plurality of apertures provided thereon and is positioned immediately adjacent to the detergent inlet of the mixing chamber. Depending upon the relative position of the disk with respect to the inlet, the concentration ratio of the detergent with respect to the clean water can be altered.

BRIEF DESCRIPTION OF THE DRAWINGS

The invention will now be described with reference to the drawings in which:

FIG. 7 is a partial, sectional view of a first embodiment of the variable fluid mixing valve mechanism shown in a first position;

FIG. 8 is a partial, sectional view of the variable fluid mixing valve of FIG. 7 shown in a second position;

FIG. 9 is a partial, sectional view of the base pan and recovery tank taken along lines 9—9 of FIG. 1;

DETAILED DESCRIPTION OF THE PREFERRED EMBODIMENTS

Figure 1:
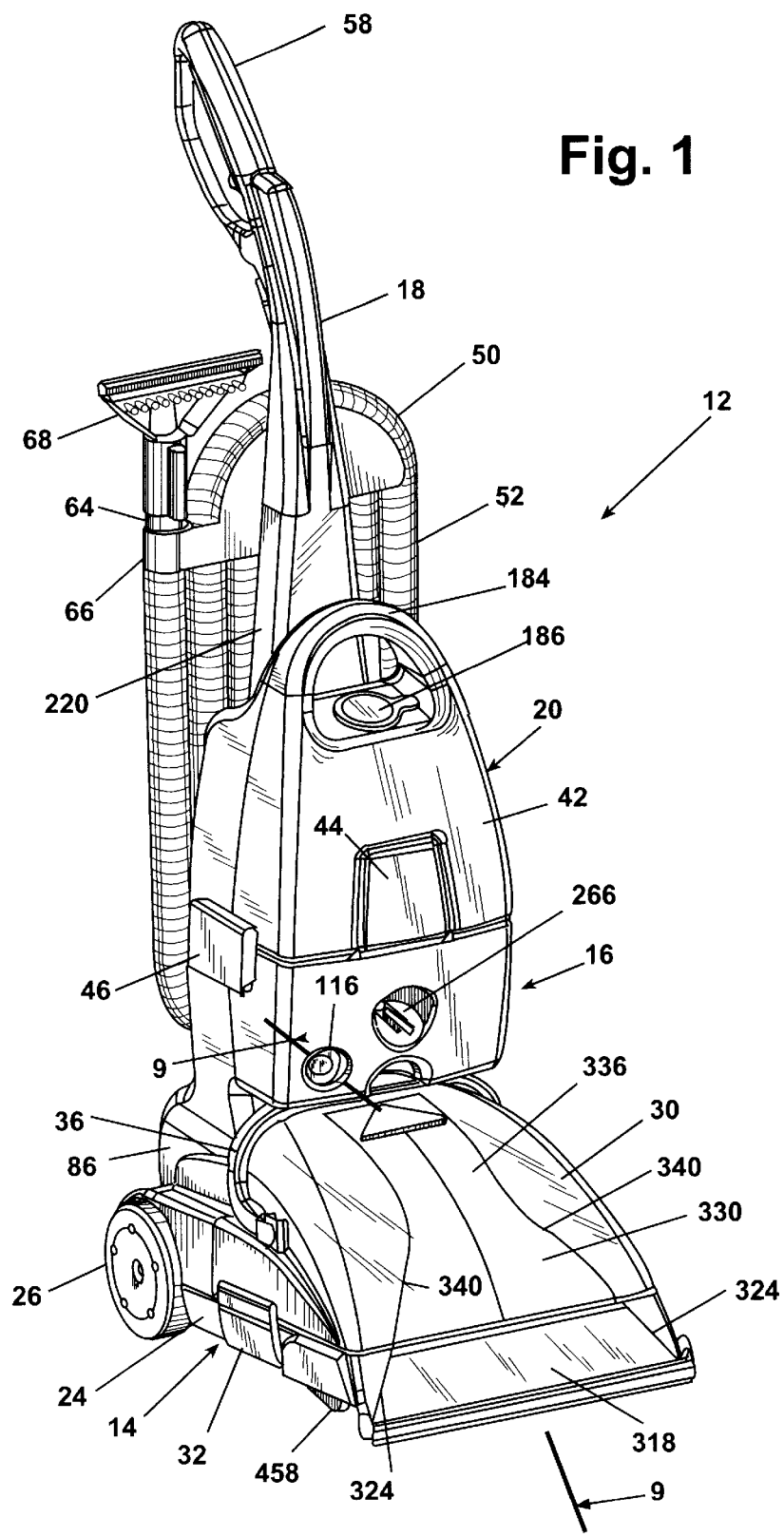
FIG. 1 is a front, perspective view of an upright water extraction cleaning machine according to the invention.
Figure 2:
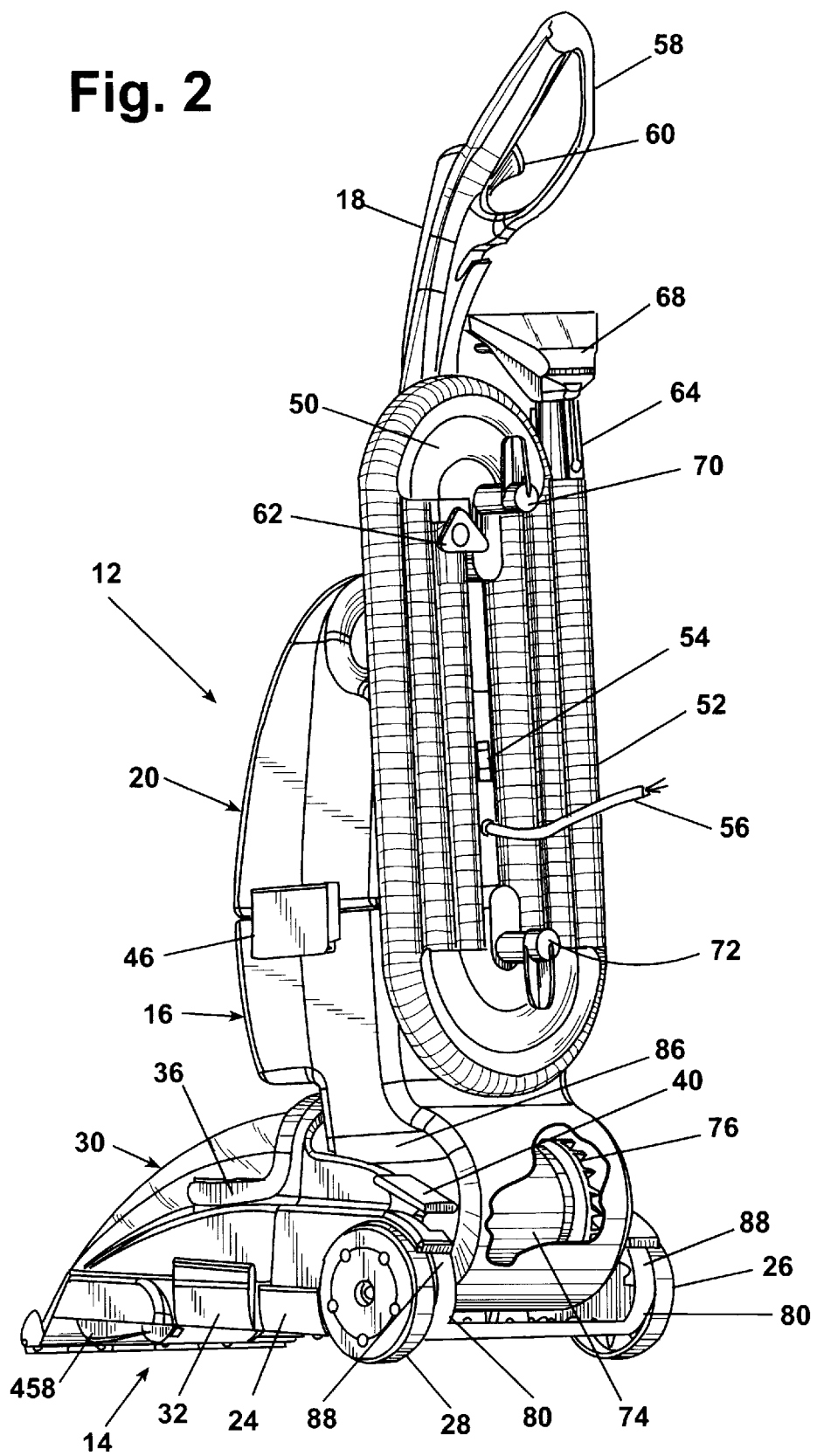
FIG. 2 is a rear, perspective view of the upright water extraction cleaning machine of FIG. 1.

Referring now to the drawings and to FIGS. 1 and 2 in particular, an upright water extraction cleaning machine 12 is shown which comprises a base assembly 14, an upper housing 16 pivotally mounted to the base assembly 14, a handle 18 extending upwardly from the upper housing 16, and a tank assembly 20 mounted to and supported by both the handle 18 and upper housing 16.

The base assembly 14 comprises a base pan 24, a pair of rear wheels 26, 28 mounted to the rear of the base pan 24, and a waste water recovery tank 30 removably supported on the base pan 24. A pair of over-center latches 32 are provided, one on each side of the base pan 24, and are adapted to cooperate with a pair of projections 34 (FIG. 10), one provided on each side of the recovery tank sidewall for locking the recovery tank 30 to the base pan 24. A handle 36 is pivotally mounted to the recovery tank 30 for carrying the tank. As described further below, the tank assembly 20 comprises a clean water tank 42 and a detergent tank 44 which nests inside the front surface of the clean water tank 42, A pair of over-center latches 46 are provided, one on each side of the sidewalls of the upper housing 16. The latches 46 are adapted to cooperate with a pair of projections 48 (FIG. 5), one of which is provided on each of the sidewalls of the clean water tank 42, for locking the tank assembly 20 to the upper housing 16 and handle 18.

An accessory hose storage rack 50 is mounted to the rear surfaces of the handle 18 and upper housing 16. The rack 50 is adapted to support and store an accessory hose 52 when the hose is not in use. The accessory hose mounting member 62 is mounted on one end of the hose 52 received in a C-shaped clip provided on the upper end of the rack 50. The flexible body of the hose 52 is wrapped around the top and bottom members of the rack 50 and the grip tube 64 mounted on the other end of the hose 52 is snapped into a C-shaped clip 66 integrally molded into the rack 50. In this position, the entire length of the accessory hose 52 is supported on the rack 50 and is easily transported with and stored on the cleaning machine 12. Preferably, the hose 52 remains on the rack at all times, except when the accessory hose 52 is in use.

The grip tube 64 of the accessory hose 52 is adapted to receive cleaning tools such as the upholstery tool 68 shown in FIGS. 1 and 2. However, any number of a variety of cleaning tools can be received on the grip tube 64 such as a crevice spray tool as seen in U.S. patent application Ser. No. 08/574,769 which is expressly incorporated herein by reference or, alternatively, a window-washing tool as seen in U.S. patent application Ser. No. 08/683,608 which is also expressly incorporated herein by reference.

A closed loop grip 58 is provided at the terminal end of the handle 18 and a trigger 60 is pivotally mounted to the handle 18 inside the closed loop grip 58. As described further below, the trigger 60 is used to control the distribution of cleaning solution from the base assembly 14.

A releasable latch 40 is mounted to the base assembly 14 and is adapted to retain the handle 18 and upper housing 16 in the upright, stored position as seen in FIGS. 1 and 2. The handle 18 can be tilted rearwardly by grasping the handle 18 and depressing the latch 40 relative to the base assembly 14. With the latch 40 depressed, the handle is then tilted rearwardly with respect to the base assembly 14.

A three-position electrical switch 54 is mounted to the rear of the handle 18. The three positions of the switch are as follows: (a) all systems off, (b) the "pre-treat" position in which both the cleaning solution pump and agitation brush are on but the vacuum motor is turned off, and (c) the "cleaning position" in which the vacuum motor, agitation brush, and cleaning solution pump are all on.

An electrical cord 56 extends outwardly from the upper housing 16 and is electrically connected to the three-position switch 54. A pair of opposed cord wraps 70, 72 are provided on the top and bottom portions of the storage rack 50 for containing the electrical cord 56 when the machine 12 is not in use.

A large number of the operative components of the machine 12 are mounted to or provided inside the upper housing 16 and handle 18. As noted previously, the tank assembly 20 is supported on the handle 18 and upper housing 16. The vacuum motor 74 and impeller fan 76 are mounted in the round, bulbous lower portion of the upper housing 16. The upper portion of the upper housing supports a large number of components of the water distribution system such as the solution pump mixing valve which will be described in greater detail, below.

Figure 3:
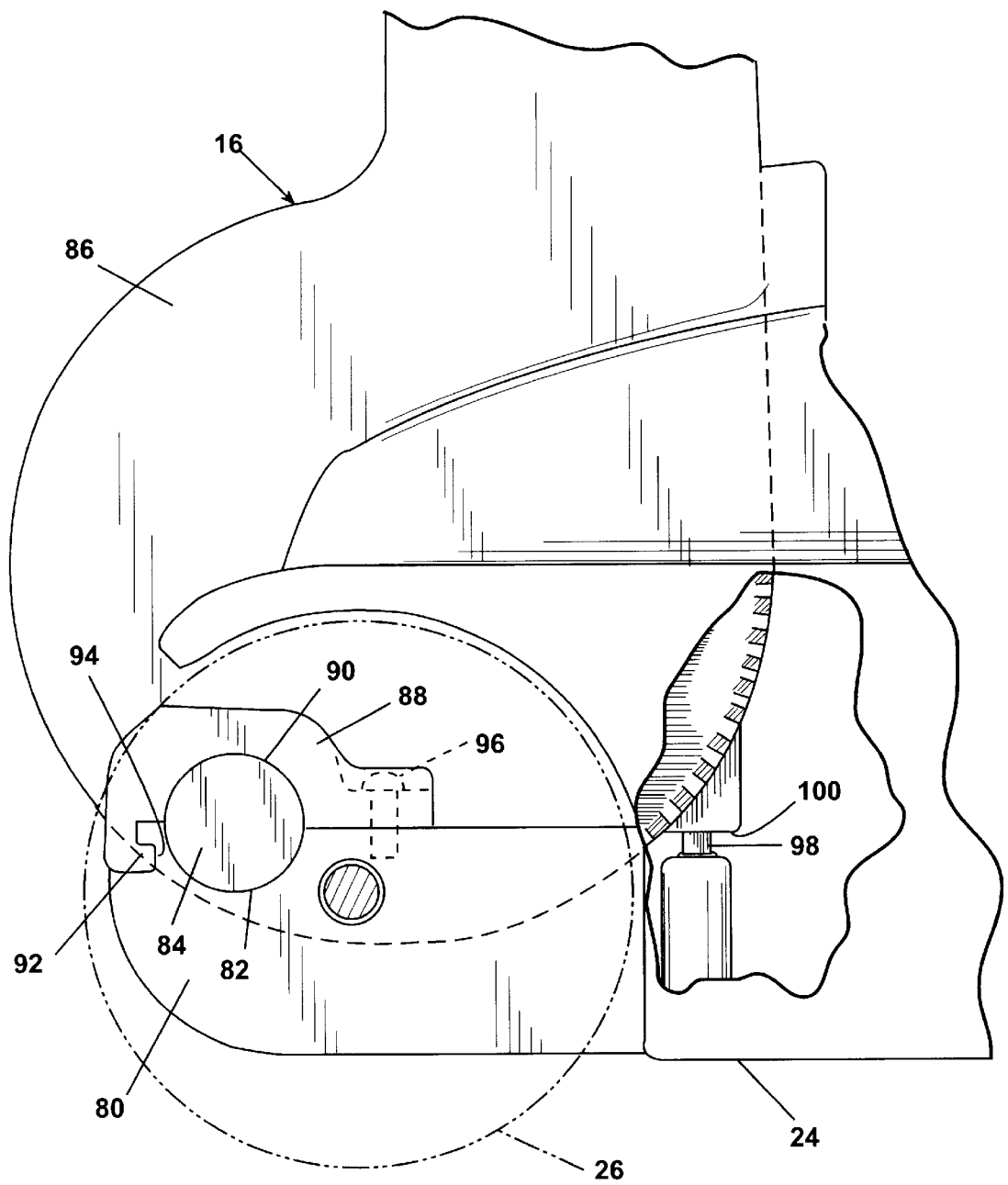
FIG. 3 is a partial, side-elevational view showing the pivot mounting of the upper housing to the base.

FIG. 3 shows the pivot mounting of the upper housing 16 to the base assembly 14. In this side elevational view, the wheel 26 has been shown in phantom lines to reveal the pivot mounting of these two elements. The pivot mounting is identical for both the right and left sides of the upper housing 16, and therefore, only the right side will be described in detail.

The base pan 24 includes an upwardly extending support member 80 with a semi-circular bearing surface 82 integrally formed therein. A substantially circular boss 84 extends outwardly from the sidewall 86 of the upper housing 16 and is adapted to be received in the bearing surface 82. A retention member 88 having an integrally molded substantially semi-circular bearing surface 90 formed therein is adapted to be secured to the top surface of the support member 80, thereby capturing the outwardly extending boss 84 of the upper housing 16 between the opposed semi-circular bearing surfaces 82, 90. Preferably, the rear portion of the retention member is secured to the base pan 24 through the sliding engagement of a corresponding projection 92 formed on the retention member 88 in a groove 94 formed on the base pan 24. A conventional fastener such as a screw 96 is provided near the front of the retention member to fixedly secure the retention member to the base pan.

As described further below, the preferred embodiment of the cleaning machine 12 incorporates a rotatably mounted agitation brush which receives the force of rotation from a brush motor mounted to the base pan 24. In any position other than the off position for the switch 54, electrical current is supplied to the brush motor for rotating the agitation brush. However, when the accessory hose 52 is being utilized, or when the handle 18 is merely in the upright position and the switch is in either the pre-treat or cleaning position, it is undesirable to permit continued rotation of the agitation brush. Therefore, an interrupt switch 98 is provided in the electrical circuit between the brush and the source of electricity. The switch 98 is mounted to the base pan 24 and adapted to cooperate with a projection 100 extending outwardly from the front, bottom surface of the upper housing 16. In the position as shown in FIG. 3, the projection 100 bears against the switch 98, thereby opening the electrical circuit between the source of electricity and the agitation brush. Therefore, the brush will not rotate, regardless of the position of the three-position switch 54. Upon rearward titling movement of the handle 18 and upper housing 16 relative to the base assembly 14, the projection 100 will pivot out of contact with the interrupt switch 98 mounted on the base pan 24. Once the projection 100 has moved out of contact with the switch 98, then the switch 98 will assume a closed position and complete the circuit between the source of electricity and the brush motor, assuming that the three-position electrical switch 54 is in any position other than off. Alternatively, the relative position of the switch and projection can be reversed so that the switch is mounted on the upper housing and selectively contacts a projection mounted on the base pan.

With the upper housing 16 and handle 18 pivotally mounted to the base assembly 14, the water extraction cleaning machine can be used in a manner similar to an upright vacuum cleaning machine. In other words, the operator can grasp the closed loop grip 58 and manipulate the base assembly 14 forward and backward over he surface being cleaned.

Figure 4:
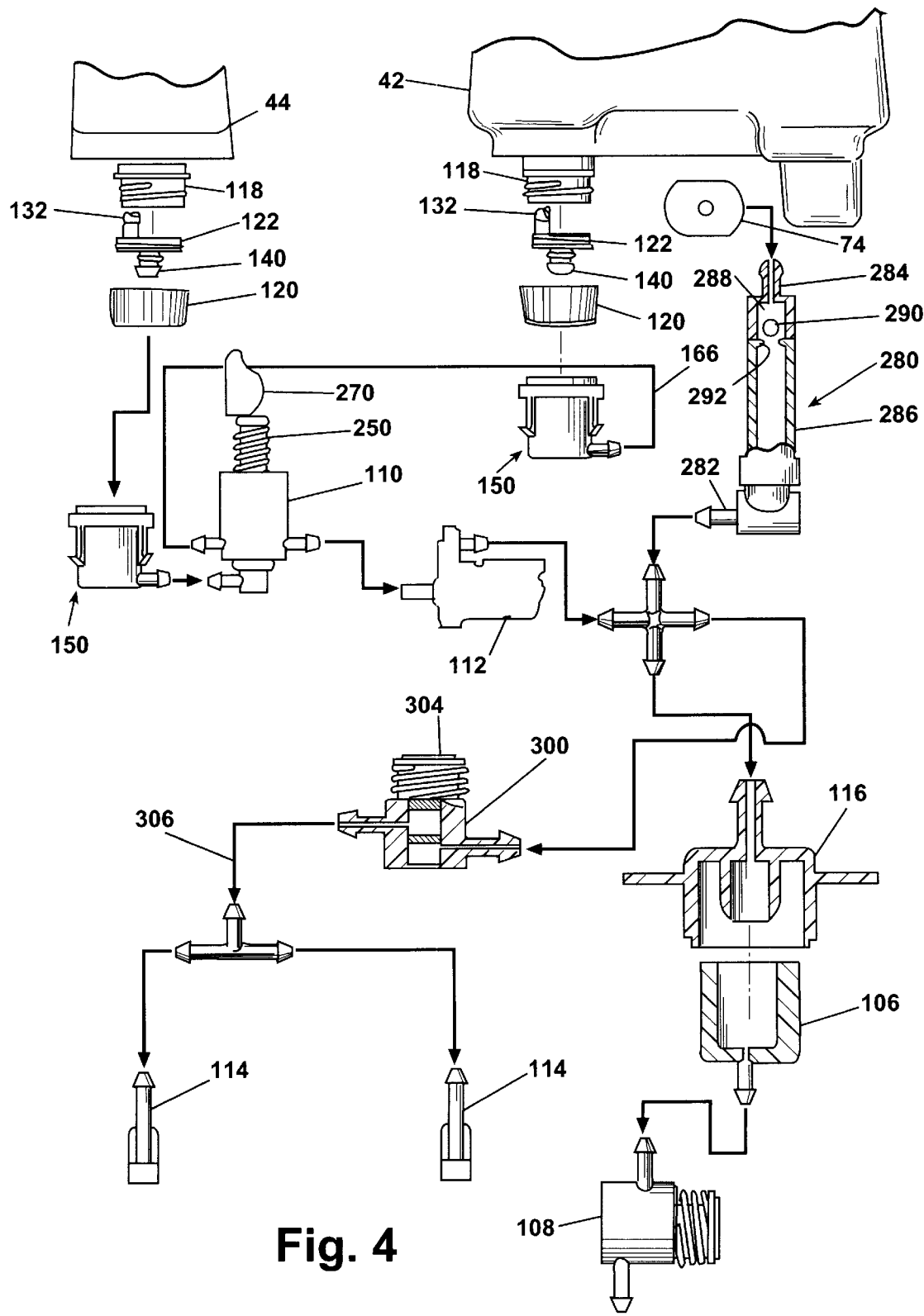
FIG. 4 is a schematic view showing the cleaning fluid distribution system of the cleaning machine of FIG. 1.

FIG. 4 is a schematic representation of the cleaning solution distribution system for the preferred embodiment of the cleaning machine. Generally, clean water and detergent are drawn from the respective tanks 42, 44 to a variable detergent/water mixing valve 110 through the operation of a pump 112. The pump 112 then conducts the pressurized cleaning solution to spray nozzles 114 provided on the base assembly 14 or to the trigger valve 108 of the accessory hose 52 through an accessory hose solution tube mounting 116 provided on the front wall of the upper housing 16 and an accessory hose tube connector 106 mounted on the end of the hose 52 opposite the cleaning tool 68.

Figure 5:
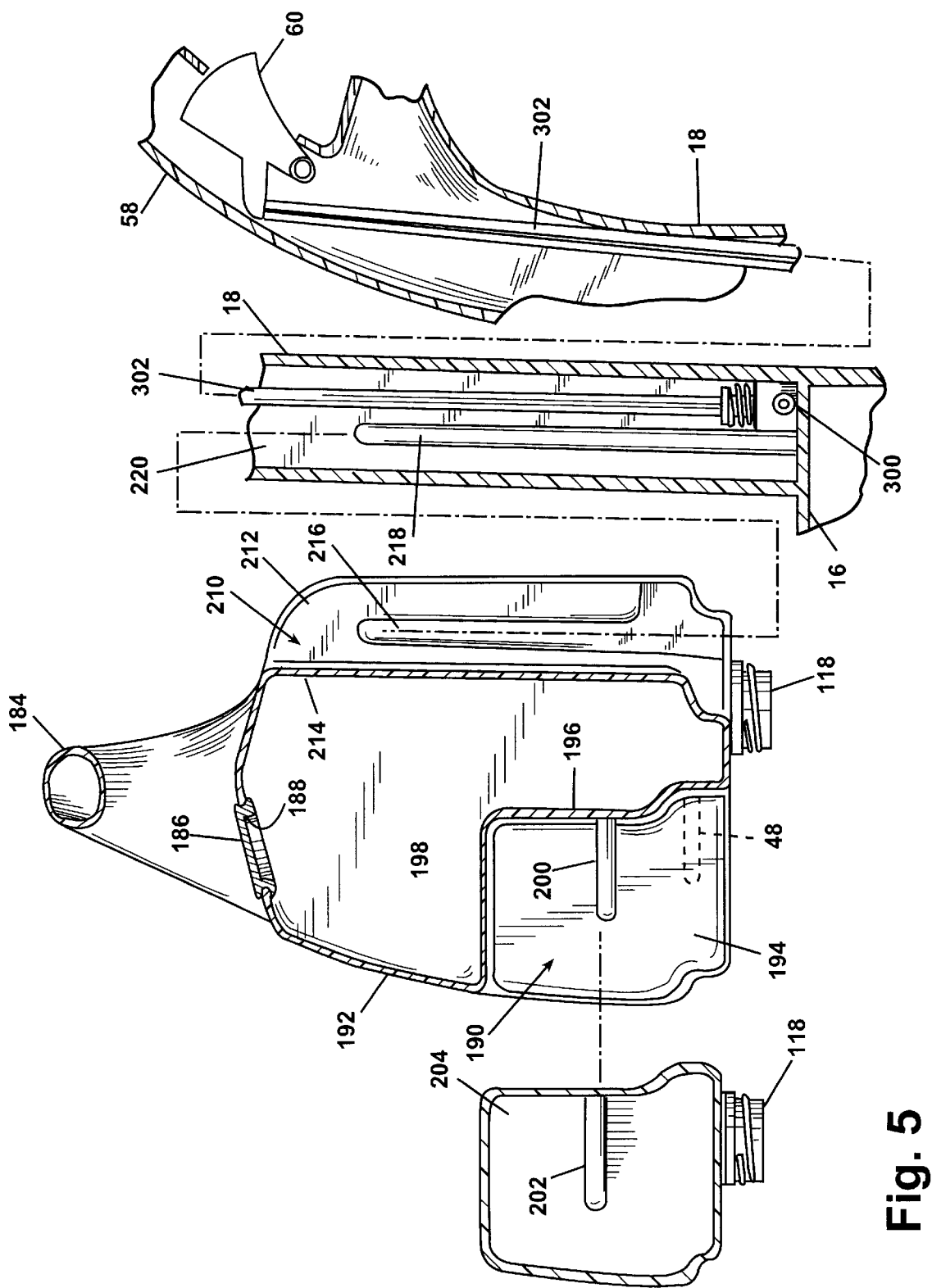
FIG. 5 is a partial, sectional, exploded view of the tank assembly and handle.
Figure 6:
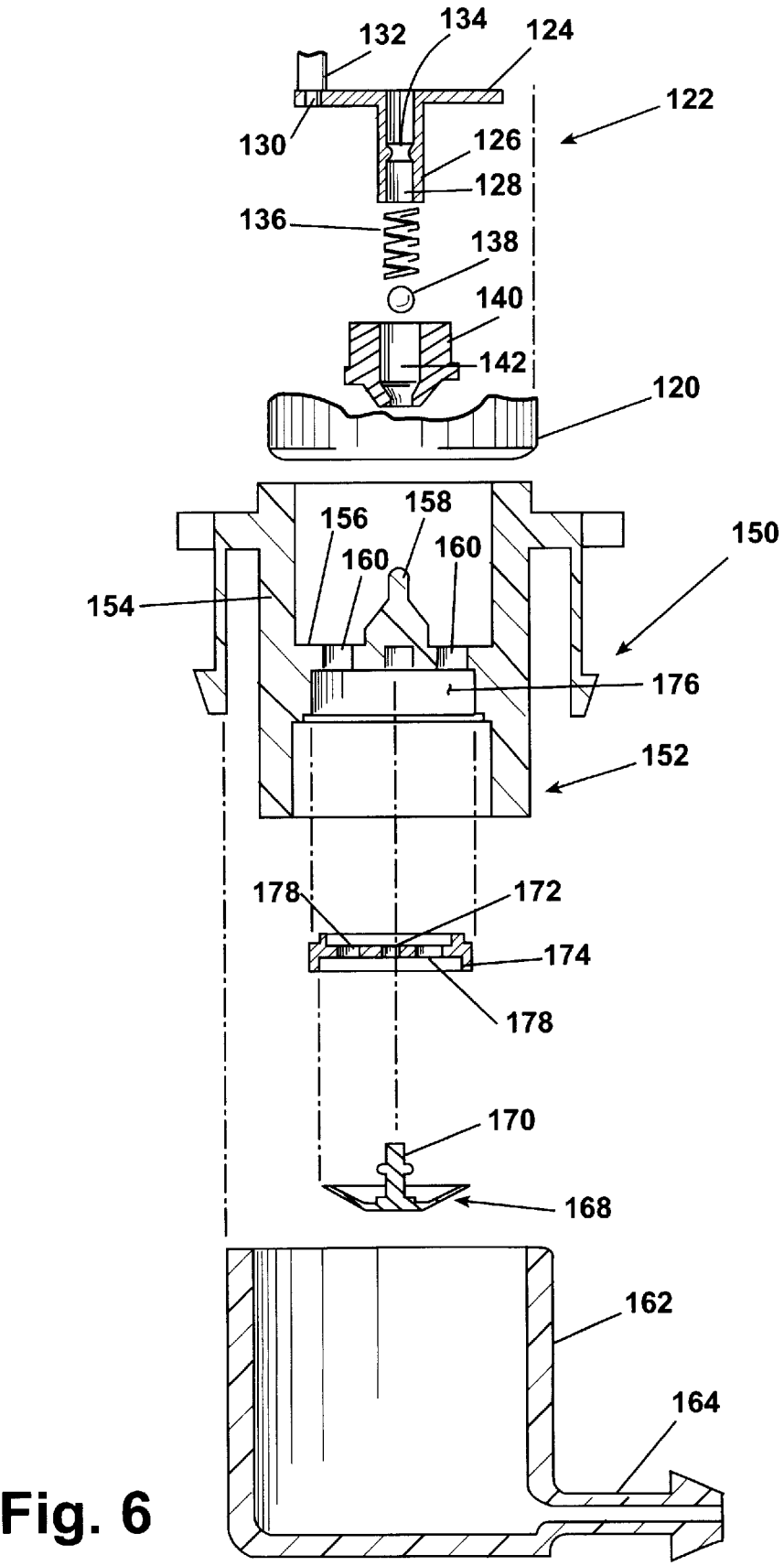
FIG. 6 is a partial, sectional, exploded view of the tank one-way valve and tank seat assembly.

Turning now to the specific structure of the cleaning solution distribution system, as seen in FIGS. 4–6, both the clean water tank 42 and a detergent tank 44 include one-way valve mechanisms on the bottom surfaces thereof which cooperate with tank seat assemblies provided on the upper surface of the upper housing 16 to control the flow of fluid from the tank to the other components of the distribution system. The structure of the one-way valves and tank seat assemblies is identical, and therefore, only the structure of the clean tank valve and seat assembly will be described in detail.

The bottom wall of the clean tank has a downwardly extending threaded boss 118 with an aperture extending therethrough. A threaded cap 120 is rotatably received on the boss 118, and mounts a one-way valve member 122 enclosing the aperture of the boss. The valve member 122 comprises a base plate 124 having a downwardly extending boss 126 with a fluid flow aperture 128 extending therethrough and a pressure release aperture 130 and straw 132 extending upwardly therefrom. Preferably, an annular shoulder 134 or other restriction is provided adjacent the top of the fluid flow aperture 128. A spring 136 and ball 138 are adapted to be received inside the flow aperture 128, beneath the shoulder 134, and an elastomeric cap 140 is mounted on the bottom of the boss 126 capturing the ball 138 and spring 136 between the cap 140 and the shoulder 134. A fluid flow aperture 142 is formed in the center portion of the cap 140, and the spring 136 is adapted to bias the ball 138 against the aperture 142 and prevent the flow of fluid therethrough.

The tank seat assembly comprises a seat member having a substantially circular flange extending upwardly and downwardly from a base plate 156. A central projection 158 extends upwardly from the base plate 156, and a plurality of fluid apertures 160 are formed in the base plate 156 intermediate the central projection 158 and the circular flange 154. A tank 162 is mounted to the seat member 152 beneath the fluid apertures 160, and a conventional hose mounting 164 extends outwardly from the tank 162. A conventional hose 166 is mounted to the hose mounting 164 and fluidly connects the tank to the pump 112.

The preferred embodiment of the seat assembly 150 also includes a one-way valve to prevent the back flow of solution from the tank 162 past the base plate. The one-way valve comprises an elastomeric umbrella valve member 168 having a central stem 170 extending from one side thereof which is received in an appropriate aperture 172 of a support disc 174. The disc 174 is supported in a suitable recess 176 provided in the seat member 152. The disc 174 has a plurality of flow apertures 178 provided therein, all of which are adapted to be covered by the umbrella valve 168. When either positive fluid pressure is exerted on to the top surface of the umbrella valve 168, or negative fluid pressure is created in the tank 162 positioned beneath the valve member 168, then the outer radius of the body of the umbrella valve 168 will deflect downwardly to permit the flow of fluid from the seat member 152 to the tank 162.

As described further below, the tanks are received on the handle 18 and upper housing 16 by vertical movement of the tank assembly 20 with respect to the upper housing 16. Eventually, the one-way valves 122 of the tanks will be telescopically received inside the tank seat assemblies 150 so that the central projection 158 extends upwardly through the elastomeric cap 140 of the one-way valve a sufficient distance to dislodge the ball 138 from the cap aperture 142, thereby permitting the flow of fluid. through the one-way valve and into the tank seat assembly 150. When the tank is lifted vertically with respect to the upper housing 16, the central projection 158 will be telescopically removed from the cap aperture 142, and the spring 136 will bias the ball 138 of the one-way valve back into sealing position to prevent the inadvertent flow of fluid through the one-way valve.

The tank assembly 20 is configured for easy refilling of the tanks and securing the tanks to the upper housing 16 and handle 18. The clean water tank 42 has an integrally molded carrying handle 184 and a cap 186 closing an aperture 188 formed on the top wall of the tank. The cap 186 can be quickly and easily removed for filling the tank 42 with clean water. As noted above, the clean water is discharged through the boss 126 and one-way valve mechanism provided on the bottom wall of the clean water tank 42.

The detergent tank 44 nests into a recess 190 accessible through the front wall 192 of the clean water tank 42. Preferably, the recess 190 is formed in the front, bottom edge of the clean water tank and is defined by a pair of opposed sidewalls 194, a rear wall 196, and a top. wall 198. A pair of substantially horizontal projections 200 are provided on the sidewalls 194 of the recess 190. These projections 200 are adapted to cooperate with a pair of substantially complimentary grooves formed in the sidewalls 204 of the detergent tank 44 for mounting the tanks to one another. The detergent tank 44 is removed from the clean water tank 42 by sliding the detergent tank 44 forward, parallel to the axis of the projections 200 and grooves 202, until the detergent tank 44 is removed from the recess 190.

The detergent tank must be refilled by unscrewing the cap 120 of the one-way valve assembly and removing the valve member 122 to permit refilling of the tank 44 through the boss aperture. Once the tank 44 has been refilled, the one-way valve member 122 and cap 120 are replaced, the tank 44 is inverted, and then slid into the recess 190 of the clean water tank 42.

As noted briefly above, the tank assembly 20 is preferably slidably mounted to the handle 18. The rear wall of the clean water tank 42 includes a U-shaped groove 210 which is substantially complementary to the front portion of the handle 18. The groove 210 is defined by a pair of opposed side 212 and front 214 walls. The sidewalls 212 include a pair of linear grooves 216 which are complementary to a pair of linear projections 218 formed on the sidewalls 220 of the handle 18. The handle projections 218 extend only a portion of the length of the handle 18. The tank assembly 20 is slidably received on the handle 18 by positioning the tank assembly 20 vertically above the upper housing 16 so that the projections 218 and grooves 216 are aligned with one another. Then the tank assembly 20 is lowered so that the tank assembly 20 is slidably received on the handle 18 and the grooves 216 receive the projections 218. The tank assembly 20 is fully received on the handle 18 when the one-way valve assemblies of the tanks 20 engage the seat assemblies 150 provided on the top wall of the upper housing 16. Once the tank assembly is in this position, then the latches 46 can be pivoted onto the projections 48 for locking the tank assembly 20 to the handle 18 and upper housing 16.

Returning to the solution flow schematic diagram seen in FIG. 4, the variable detergent/water mixing valve 110 is positioned intermediate the tank seat assemblies 150 and the solution pump 112. Preferably, the mixing valve is a variable mixing valve 110 to accommodate differing mixtures of detergent and clean water. As seen in FIGS. 4, 7, and 8, the variable mixing valve 110 comprises a valve body 230 forming a detergent/water mixing chamber 260 having a clean water inlet port 232 which is fluidly connected to the clean water tank seat assembly 150 by a hose 234 and a detergent inlet port 236 which is fluidly connected to the detergent tank seat assembly 150 by a hose 238. A solution outlet port 240 is also formed on the valve body 230 and is adapted to conduct the clean water and detergent mixture from the mixing valve 110 to the pump 112 through a hose 242. A variable flow rate valve is mounted in the body 230 and is movably associated with the clean water inlet port 232 or the detergent inlet port 236 for varying the relative proportions of the clean water and detergent delivered to the solution outlet 240.

The valve body is formed from an end cap 244, a central body portion 246, and an end inlet member 248 mounted to the end of the central body portion 246 opposite the end cap 244. The variable flow rate valve includes a plunger 250, which extends through an aperture in the end cap 244 such that a portion of the plunger 250 is received inside the central body portion 246 and the end inlet member 248, and a portion of the plunger 250 extends outwardly from the end cap 244. A spring 252 is mounted on the exposed portion of the plunger 250 and is adapted to bias the plunger, 250 into the extended position, as seen in FIG. 7. In actual practice, it has been found preferable to eliminate the spring 252 and mount a cam follower to the end of the plunger 250 and couple the cam follower (not shown) to the cam 270 so that the cam 270 positively pulls the plunger 250 upwardly as well as pushes it downwardly. A collar 254 positioned along the length of the shaft of the plunger 250 with an annular groove 256 formed therein adapted to receive an O-ring 258. The collar 254 and O-ring 258 are adapted to create a fluid seal inside the circular valve body and in cooperation with the central body portion define the mixing chamber 260 therein. An O-ring 262 is provided in the central body portion 246 immediately adjacent the end inlet member 248. The O-ring 262 cooperates with the plunger 250 to effectively seal the end inlet member 248 and detergent inlet 236 from the mixing chamber 260, depending upon the axial position of the plunger 250 within the valve body 230.

A tapered groove 264 is formed on the end of the plunger 250 opposite the spring 252. The groove 264 extends along the surface of the plunger 250, preferably passes through the end wall of the plunger 250, and is tapered so that the groove 264 has a greater cross-sectional area immediately adjacent the end than it does a spaced distance therefrom. The purpose of the tapered groove 264 is to accommodate varying flow rates of detergent from the detergent inlet 236 into the mixing chamber 260 of the valve body 230.

A control knob 266 is mounted on an exterior wall 268 of the upper housing 16 for controlling the water/detergent ratio in the cleaning solution delivered to the pump 112. A cam 270 is mounted to the rear surface of the knob 266, and the cam 270 is positioned so that the terminal end of the plunger 250 bears against the contoured surface 272 of the cam 270. FIGS. 7 and 8 depict the two extreme ranges of solution mixtures in the preferred embodiment of the cleaning machine 12. FIG. 7 shows the plunger 250 extended outwardly from the valve body 230 the maximum distance. In this position, the maximum length of the tapered groove 264 is extended into the mixing chamber 260 of the valve. Therefore, the maximum amount of detergent will be drawn into the mixing chamber 260 and ultimately discharged to the pump 112.

FIG. 8 depicts the other extreme position in which the plunger 250 is positioned so that the entire length of the tapered groove 264 is withdrawn from the mixing chamber 260 so that there is no fluid flow communication between the detergent inlet port 236 and the mixing chamber 260. Therefore, only clean water will be directed to the pump 112. The contoured surface 272 of the cam 270 permits an infinite number of detergent to water mixing ratios between the two extremes shown in FIGS. 7 and 8.

In the preferred embodiment, the knob 266 and cam 270 are received in only one of three positions: the water only or "rinse" position as seen in FIG. 8; a maximum detergent to water mixing ratio as seen in FIG. 7; or a standard mixing ratio half-way between the extremes shown in FIGS. 7 and 8. In use, the knob 266 is positioned at the standard mixing ratio position for the vast majority of cleaning operations. When a high traffic or heavily stained area is encountered, the knob 266 can be rotated to the maximum detergent position as seen in FIG. 7. If a final clean water rinsing operation is desired, then the knob 266 can be rotated to the water only position as seen in FIG. 8. The incorporation of the variable mixing valve 110 permits varying the water/detergent mixture ratios to accommodate a wide variety of cleaning situations.

Figure 16:
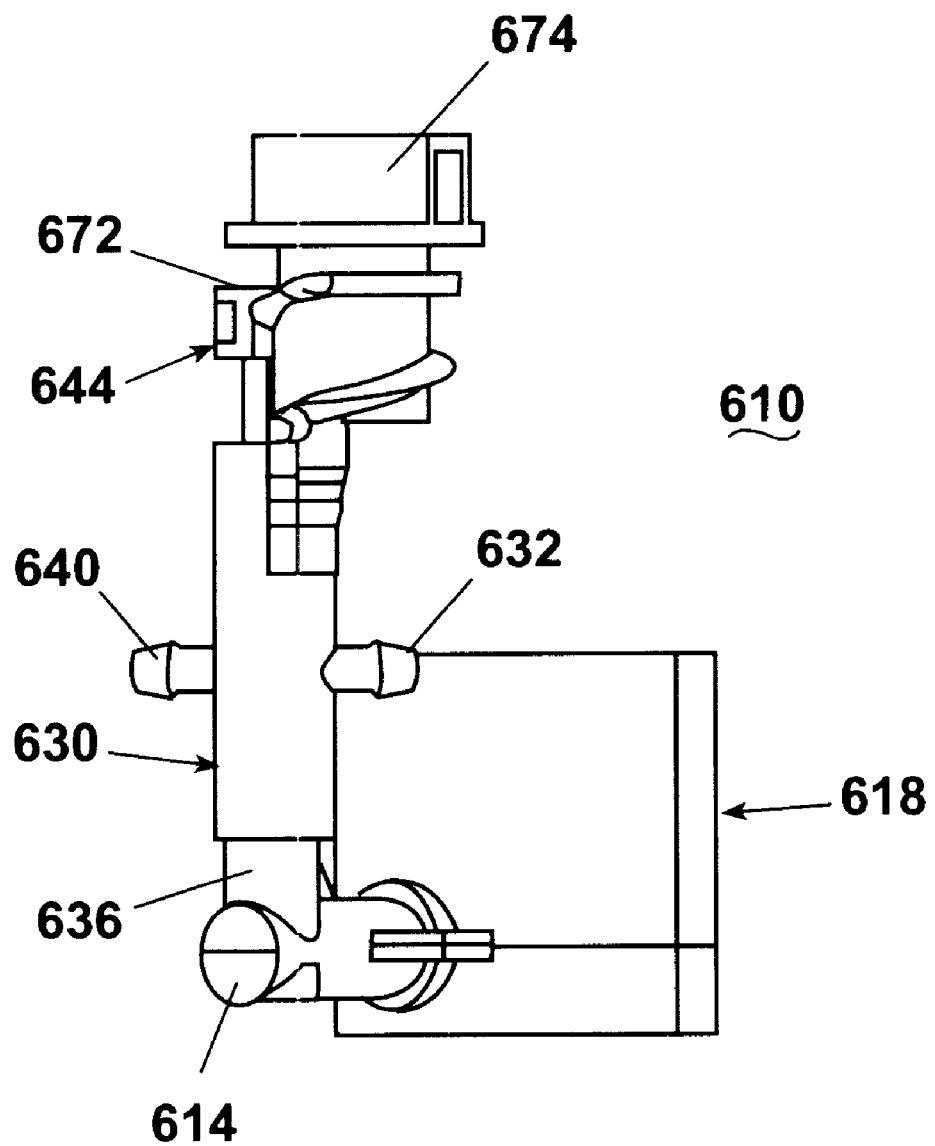
FIG. 16 is a perspective view of an alternative variable fluid mixing valve according to the invention.
Figure 17:
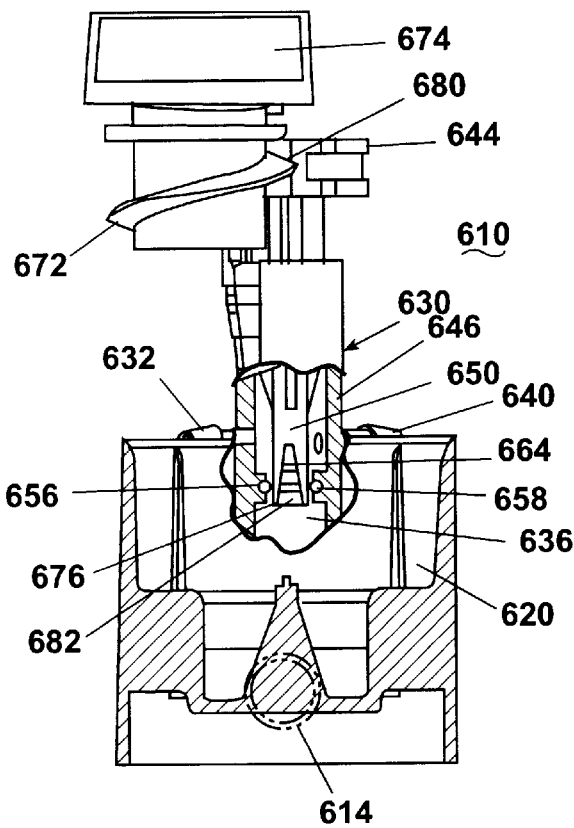
FIG. 17 is a partial sectional view of the alternative variable fluid mixing valve of FIG. 16 with the valve stem in a first position.
Figure 18:
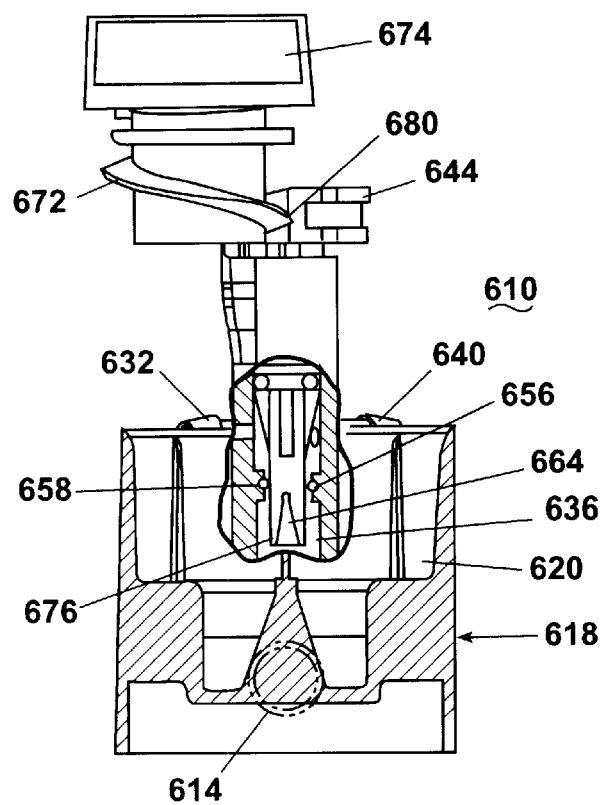
FIG. 18 is a partial sectional view of the variable fluid mixing valve of FIGS. 16–17 with the valve stem in a second position.

An alternative variable detergent/water mixing valve assembly 610 is positioned intermediate the tank assembly 20 and the solution pump 112. As seen in FIGS. 16–18, the variable mixing valve 610 comprises a valve body 630 forming a detergent/water mixing chamber having a clean water inlet port 632 that is fluidly connected to the clean water tank 42 and a detergent inlet port 636 that is fluidly connected to the detergent tank 44 by a valve seat 618 and the L-shaped conduit 614. A mixed solution outlet port 640 is also formed on the valve body 630 and is adapted to conduct the clean water and detergent mixture, i.e., the cleaning solution, from the mixing valve 610 to a fluidly connected pump 112. A variable flow rate valve is mounted in the body 630 and movably associated with the clean water inlet port 632 or the detergent inlet port 636 for varying the relative proportions of the clean water and detergent delivered to the solution outlet port 640.

The variable flow rate valve of the mixing valve assembly 610 includes an end cap 644 mounting a coaxial plunger 650 in a central body portion 646 of the valve body 630, as best illustrated in FIGS. 17–18. The end cap 644 partially receives a thread 672 of a knob 674 such that the plunger 650 can be raised or lowered in the valve body 630 when the knob 674 is turned.

The central body portion 646 of the valve body 630 includes an annular groove 656 formed therein. An O-ring 658 is received within the groove 656. A distal end 676 of the plunger 650 and the O-ring 658 are adapted to create a fluid seal inside the circular valve body 646 when the plunger 650 is in its lowermost portion, as shown in FIG. 18, and define a mixing chamber for water and cleaning fluid when the plunger 650 is raised from its lowermost position, as shown in FIG. 17.

The distal end 676 of the plunger 650 further includes a tapered groove 664, which is tapered so that the groove has a greater cross-sectional area immediately adjacent the head end 676 than it does a distance spaced upwardly therefrom. The tapered groove 664 is positioned in the detergent inlet 636 opening to control the flow of detergent therethrough. That is, the tapered groove 664 accommodates varying flow rates of detergent from the detergent tank 44, through the hose 238, and through the detergent inlet 636 into the valve body 630. The lower the plunger 650 is seated in the inlet 636, the less the area of exposure of the tapered groove 664 in the valve body 630, thereby limiting the flow of detergent thereto.

The control knob 674 has a depending shaft which is mounted on an outside wall of the upper housing of the extraction cleaner for rotation about a longitudinal axis of the shaft for controlling the water to detergent ratio in the cleaning solution delivered to the pump 112. The longitudinal axis of the control knob shaft is perpendicular to the outside wall of the upper housing. The control knob 674 can also be mounted to an outside wall of the lower housing. The control knob 674 is mounted adjacent the end cap 644 and includes a thread 672 that is received in a groove 680 of the end cap 644, so that rotation of the knob 674 lowers or raises the plunger 650 in the valve body 630. In a first position shown in FIG. 16, with the plunger 650 extends upwardly from the valve body 646, the maximum cross-sectional area of the tapered groove 664 is exposed to define an inlet aperture 682 into the valve body 646. Therefore, the maximum amount of detergent will be drawn into the valve body 630 to mix with clean water supplied via inlet 632, and ultimately discharged to the pump 112. The other extreme position of the plunger 650 lowers the tapered groove 664 from the mixing chamber completely so if there is no aperture 682 and thus no fluid flow communication between the detergent inlet 636 and the valve body 646. Therefore, only water will be directed to the pump 112.

As should be evident, rotation of the threaded knob 674 will provide an infinite number of detergent-to-water mixing ratios between the two extremes described above. The housing wall can have indicia adjacent the knob to indicate the degree of detergent-to-water ratios associated with different positions of the knob on the housing. The control knob 674 has a pointer associated with the indicia to indicate the degree of detergent-to-water mixing ratio for any given position of the control knob 674. In the preferred embodiment, the knob 674 is rotatable to three positions indicated on the housing: The first is a water only or "rinse" position; second, a maximum detergent-to-water mixing ratio where the tapered groove 664 is fully exposed in the valve body 630; or third, a standard mixing ratio approximately half way between the extremes described previously. The extreme positions are defined by the shape of the length of the thread 672, which includes opposite ends defining a pair of extreme positions for limiting the rotation of the knob 674 relative the cap 644. The thread is of a fairly large pitch so that the mixing ratios can be adjusted with a rotation of the control knob 674 through an angle of less than 360°, preferably, less than 180°, and in some cases through an angle of about 90°. Thus, the operator of the cleaning machine can look at the control knob and quickly and easily dial in the desired ratio of detergent to clean water.

In use, the knob 674 is positioned at the standard mixing ratio position for the vast majority of cleaning operations. When a high-traffic or heavily stained area is encountered, the knob 674 can be rotated to the maximum detergent position. If a clean-water rinsing operation is desired, then the knob 674 can be rotated to the water only position.

As noted above, the pump 112 is positioned downstream from the variable mixing valve 110,610. When the pump 112 is energized and primed, the pump 112 will draw fluid from the mixing valve 110,610 and tank seat assemblies 150 at the prescribed ratio. Preferably, the pump 112 is not a self-priming pump and, therefore, some means should be incorporated to assist priming of the pump 112. As seen in FIG. 4, the fluid flow system includes a pump priming valve 280 which is preferably mounted vertically above the pump 112 and the tank seat assemblies 150 in the base of the handle 18. The pump priming valve 280 is fluidly connected on the bottom end 282 to the outlet of the pump 112 and fluidly connected on the top end 284 to the impeller fan chamber of the vacuum motor 74 (FIG. 2). The pump priming valve 280 comprises a valve body having a fluid aperture extending therethrough wherein the fluid aperture is divided into an elongated fluid chamber 286 immediately adjacent the bottom of the valve and a ball chamber 288 which is positioned immediately adjacent the top end of the valve. Preferably, a small shoulder 292 is formed inside the valve body to define the two chambers, and a ball 290 or conical rubber plug is received inside the ball chamber.

In operation, the pump 112 will be primed with the fluid from the solution tanks by turning the pump 112 on and the vacuum motor 74 on. The vacuum motor 74 will exert negative pressure on the fluid outlet of the pump 112 through the pump priming valve 280 thereby drawing any air between the pump inlets and the solution tanks therethrough. The air will be drawn through the pump priming valve 280 into the vacuum impeller fan chamber or into the recovery tank 30. Preferably, the weight of the ball 290 is coordinated with the amount of negative air pressure applied to the pump priming system from the vacuum motor so that the negative air pressure applied to the ball chamber 288 is insufficient, by itself, to draw the ball 290 upwardly and seal the outlet of the pump priming valve.

As the vacuum motor 74 operates to draw the air from the system, it is likely that some fluid will enter the pump priming valve 280. Preferably, the size of the elongated fluid chamber 286 is dimensioned to accommodate a sufficient amount of fluid to permit full priming of the pump 112. Eventually, the fluid level will rise inside the pump priming valve 280 and fluid will enter the ball chamber 286. The ball 290 is preferably formed of a buoyant material so that as the fluid level rises inside the ball chamber 286, the ball 290 similarly rises until the ball 290 ultimately bears against the outlet and seals the priming valve 280 to prevent solution from flowing therefrom. Once this seal has established, the pump should be sufficiently primed for normal operation.

Following the pump priming valve 280, the pressurized solution is simultaneously directed to the accessory hose solution tube mounting 116 and the trigger valve 300. As seen in FIGS. 4 and 5, the trigger valve is positioned in the base of the handle 18 immediately below the bottom end of an actuator rod 302. The rod 302 extends upwardly to pivotally interconnect with the trigger 60 provided in the closed loop grip 58 of the handle 18. In the preferred embodiments, multiple actuator rods 302 are interconnected to traverse the distance between the trigger 60 and the trigger valve 300.

Upon squeezing of the trigger 60 relative to the closed loop grip 58, the actuator rods 302 are displaced downwardly to squeeze the plunger 304 of the conventional trigger valve 300 and permit the flow of fluid therethrough. With the trigger valve 300 in the open position, pressurized fluid flows through a conventional conduit 306 to a pair of spray tips 114 mounted to the base pan 24 immediately adjacent the agitation brush. Preferably, the spray tips 114 are adapted to create a fan-shaped spray pattern which traverses substantially the entire width of the agitation brush and suction nozzle opening.

Figure 10:
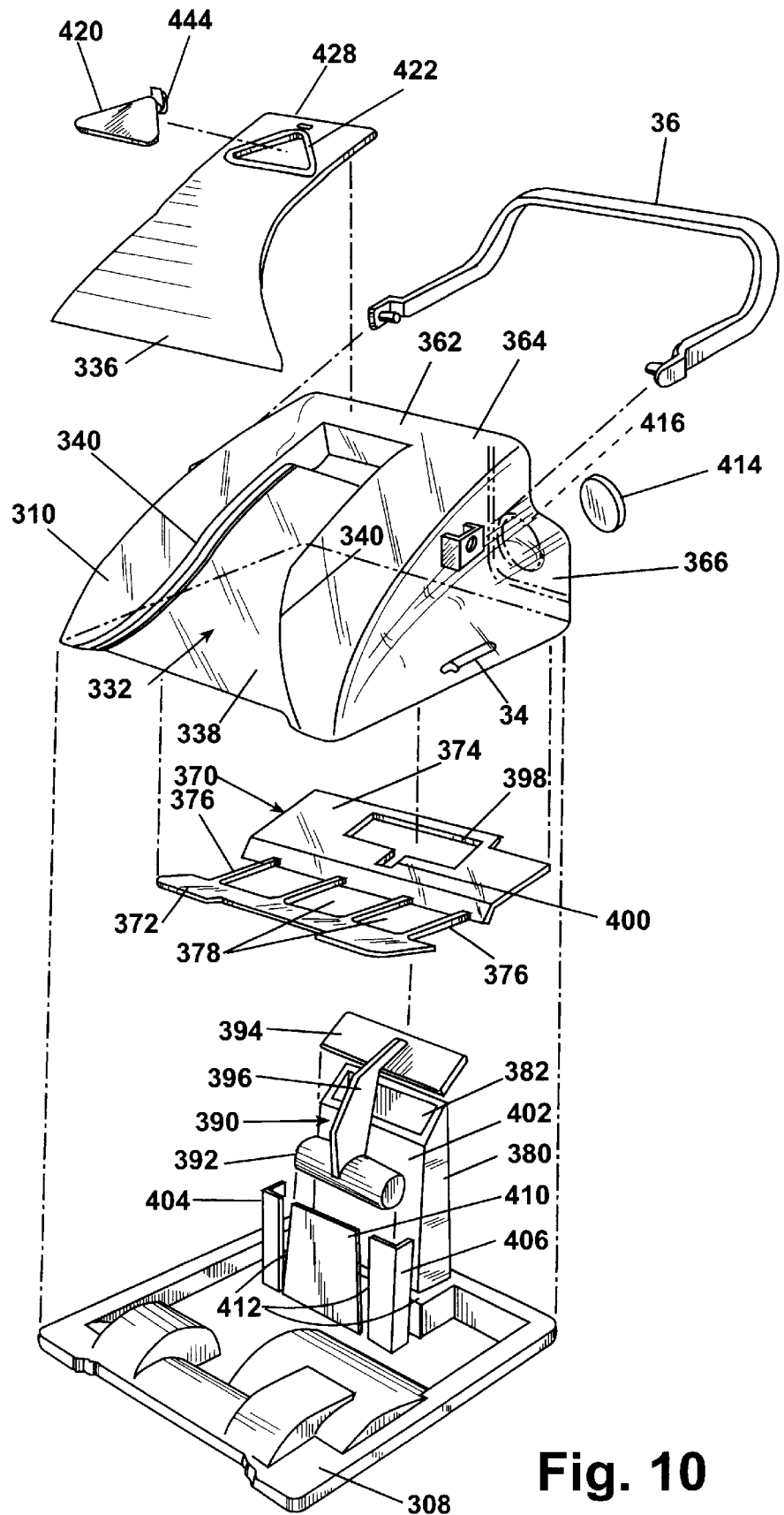
FIG. 10 is an exploded view of the recovery tank assembly.

Turning now to the fluid recovery system, the vacuum motor 74 and impeller fan 76 generate negative air pressure which is communicated from the upper housing 16 to the base assembly 14 for recovery of used solution and dirt. As seen in FIGS. 9 and 10, the working air flow path for on-the-floor cleaning begins at the suction nozzle opening 316 provided at the front, forward edge of the base assembly 14. Preferably, the suction nozzle opening is defined by a front 318 and a rear 320 plate members which are mounted to one another and which also define the initial working air flow conduit 322. The suction nozzle opening 316 extends the entire width of the base assembly 14 and the plate members 318, 320. A pair of sidewalls 324 are integrally formed into the rear plate member to define the sides of the initial flow conduit. Preferably, the sidewalls 324 taper upwardly and inwardly (see FIG. 1). The initial flow conduit terminates at an outlet 326 positioned along the top edges of the plate members and sidewalls. In view of the fact that the sidewalls of the flow conduit taper upwardly and inwardly, the length of the outlet of the initial suction flow conduit is less than the length of the suction nozzle opening and the width of the base assembly 14. Preferably, an elastomeric gasket 328 is mounted to the top edges of the front and rear plates 318, 320 and surrounds the outlet 326. From the initial flow conduit 322, the air/water/dirt mixture flows into the waste water recovery tank 30 which is an assembly of a bottom member 308 and a top member 310 having a top wall 364, a pair of sidewalks 366, and a rear wall 368. The working air flows from the initial flow conduit 322 to an intermediate working air flow conduit 330 which is defined by a depression 332 formed in the top wall 364 of the recovery tank 30 and a cover plate 336 secured thereto. The depression 332 comprises a bottom wall 338 and a pair of opposed sidewalls 340. Preferably, the sidewalls 340 initially taper inwardly from the inlet 342 of the intermediate working air conduit a short distance and then ultimately extend parallel to one another approaching the outlet 344 of the intermediate working air conduit 330. Preferably, the cover plate 336 is formed of a transparent, plastic material, and the top wall 364 and sidewalks 346 of the recovery tank 30 are formed of a smokey, translucent material. Utilizing these materials and the structure of the intermediate flow conduit 330, the user can easily observe the dirt and water passing up through the intermediate flow conduit 330 and also easily observe the fluid level inside the recovery tank 30.

The outlet 344 of the intermediate flow conduit 330 is positioned immediately adjacent an air/water separator baffle 350 which is integrated into the recovery tank 30 and is formed by a downwardly extending rear wall 352, a pair of parallel, downwardly extending sidewalls 354, and a bottom wall 356 extending forwardly from the rear wall 352. With this structure, the working air flow enters the hollow interior of the recovery tank 30 and is immediately redirected approximately 180' as it is directed downwardly into the tank interior. The water and dirt will enter the air/water separator baffle 350 and strike the various walls of the baffle 350 and fall downwardly into the tank.

In addition to the redirection of the working air flow as it enters the tank 30, the effective cross-sectional area of the working air conduit is dramatically increased as the air/water mixture passes from the intermediate working air conduit into the air/water separator baffle and the recovery tank. This sudden increase in cross-sectional area results in a significant drop in velocity for the working air, thereby assisting in the separation of dirt and water.

A fluid containment baffle 370 is mounted inside the hollow interior of the recovery tank 30 and is intended to prevent excessive sloshing of the recovered dirt and liquid and also contain any foam generated inside the tank. The baffle 370 comprises a front, downwardly extending portion 372 and a rear downwardly extending portion 374 which are spaced from one another but interconnected to one another by multiple stringers 376. The stringers 376 and edges of the front 372 and rear portions 374 define fluid apertures 378 therebetween. Preferably, the baffle 370 is mounted to the rear wall 368, sidewalls 366, and top wall 364 of the top member 310 a spaced distance from the bottom member 308. Preferably, the fluid flow apertures 378 are positioned immediately below the air/water separator 350 so that as the dirt and water drop therefrom, they pass through the apertures 378 into the lowermost portion of the recovery tank 30.

The front 372 and rear 374 portions of the baffle 370 are contoured to prevent excessive sloshing of the recovered liquid during movement of the cleaner 12. For example, when the user is moving the base assembly 14 forward and then reverses the direction and pulls the base assembly 14 rearwardly, the water and dirt present within the tank will surge toward the front of the recovery tank 30. The water will strike the sloping top wall 364 of the recovery tank 30 and be deflected rearwardly. Any water which may be deflected upwardly will strike the downwardly extending front portion 372 of the baffle 370 and, therefore, be deflected downwardly to the lowermost portion of the recovery tank 30. The downwardly extending rear portion 374 of the baffle 370 will similarly deflect fluid downwardly. The baffle 370 serves to prevent excessive sloshing of fluid in the tank and also provides the added benefit of containing any foam which may build up in the tank beneath the baffle 370 spaced away from the air/water separator 50 and fluid outlet.

An air flow outlet stand pipe 380 is integrally formed into the bottom member 308 and is provided at the rear of the recovery tank 30. The stand pipe extends upwardly to a point adjacent the uppermost portion of the recovery tank 30, opposite the outlet of the air/water separator baffle 50. In addition, the inlet opening 382 of the stand pipe 380 is positioned vertically above the baffle 370. With this structure, the substantially dry air exiting the air/water separator 350 will pass around the bottom 356 and sidewalls 354 of the air/water separator 350 and through the inlet opening 382 of the stand pipe 380 whereas the dirt and water will fall through the baffle apertures 378 into the lowermost portion of the recovery tank 30.

A manifold chamber 384 is formed at the bottom of the stand pipe 380 and defined by the bottom member 308 and the base pan 24. Preferably, all elastomeric gasket 388 is mounted to the top of the manifold chamber 384 to create a substantially air-tight seal between the bottom of the stand pipe 380 and the manifold chamber 384. A flexible conduit hose 386 extends from one end of the manifold to the impeller fan chamber mounted in the lower portion of the upper housing 16. In view of the fact that the upper housing 16 pivots with respect to the base pan 24 and recovery tank 30, the conduit 386 is preferably formed of a pliable, yet durable material.

A float 390 is provided inside the recovery tank 30 to prevent overfilling of the recovery tank 30 with fluid. The float 390 comprises a buoyant base 392 and a closure plate 394 interconnected to one another by a support plate 396. The closure plate 394 is dimensioned to fully seal the inlet opening 382 of the stand pipe 380 and prevent the flow of air or liquid therethrough.

The float 390 is limited primarily to vertical movement with respect to the recovery tank 30, and the closure plate is positioned above the fluid containment baffle 370 and the buoyant base 392 of the float 390 is positioned below the fluid containment baffle 370. The fluid containment baffle 370 also includes an aperture 398 through which the stand pipe 380 extends. In addition, a narrow slot 400 is also provided in the rear portion 374 of the fluid containment baffle 370 through which the support plate 396 of the float 390 extends. In the assembled position, the closure plate 394 is positioned above the fluid containment baffle 370 and the buoyant base 392 is positioned below the baffle 370.

Movement of the float is constrained because the buoyant base is captured in a float cage defined by the front wall 402 of the stand pipe 380, a pair of L-shaped walls 404, 406 extending up from the bottom member 308, a substantially planar wall 408 extending upwardly from the bottom member 308 intermediate the two U-shaped wall members 404, 406 and the rear portion 374 of the fluid containment baffle 370. Multiple slots 412 or fluid flow apertures are provided between the wall members 404, 406, 408 and the stand pipe 380 so that fluid will quickly and easily flow into the float cage defined by these elements.

As the fluid within the tank and the float cage rises, so will the float 390 until eventually, the closure plate 394 nears the inlet opening 382 of the stand pipe 380 and is sufficiently drawn up against the stand pipe 380 to close the air flow therethrough. Once this happens, the sound of the operating vacuum motor 74 will change dramatically, warning the user that the recovery tank 30 is full and must be emptied.

The waste water recovery tank 30 is quickly and easily emptied by first tilting the handle 18 and upper housing 16 rearwardly. Then, the latches 32 are disengaged from the projections 34 on the recovery tank 30. The user grasps the handle 36 and merely lifts the tank 30 from the base pan 24 and transports it to an appropriate site for emptying the tank 30. The tank 30 is emptied by removing a cap 414 mounted to the drainage aperture 416 provided on the rear wall 368 of the tank 30. Once the tank 30 has been emptied, the cap 414 is replaced, the tank 30 is lowered down onto the base pan 24, and finally, the latches 32 are snapped over the projections 34 to lock the tank to the base assembly 14.

As seen in FIG. 2, the entirety of the accessory hose 52 is contained on the accessory hose storage rack 50 when the cleaning machine 12 is used for on-the-floor cleaning or when the machine is being stored. When it is desired to use the accessory hose 52, the user unsnaps the grip tube 64 from the C-shaped clip 66 of the hose rack 50 and unwinds the hose therefrom and then removes the accessory hose mounting member 62 from its corresponding C-shaped clip on the storage rack 50. Next, the user removes the cap 420 from the recovery tank 30 cover plate 336 exposing the accessory hose flow aperture 422 and inserts the accessory hose mounting member 62 therein. The mounting member 62 comprises an elbow-shaped rigid conduit 424 which receives the flexible hose on one end thereof and a triangular shaped mounting plate 426 on the other end thereof.

Figure 11:
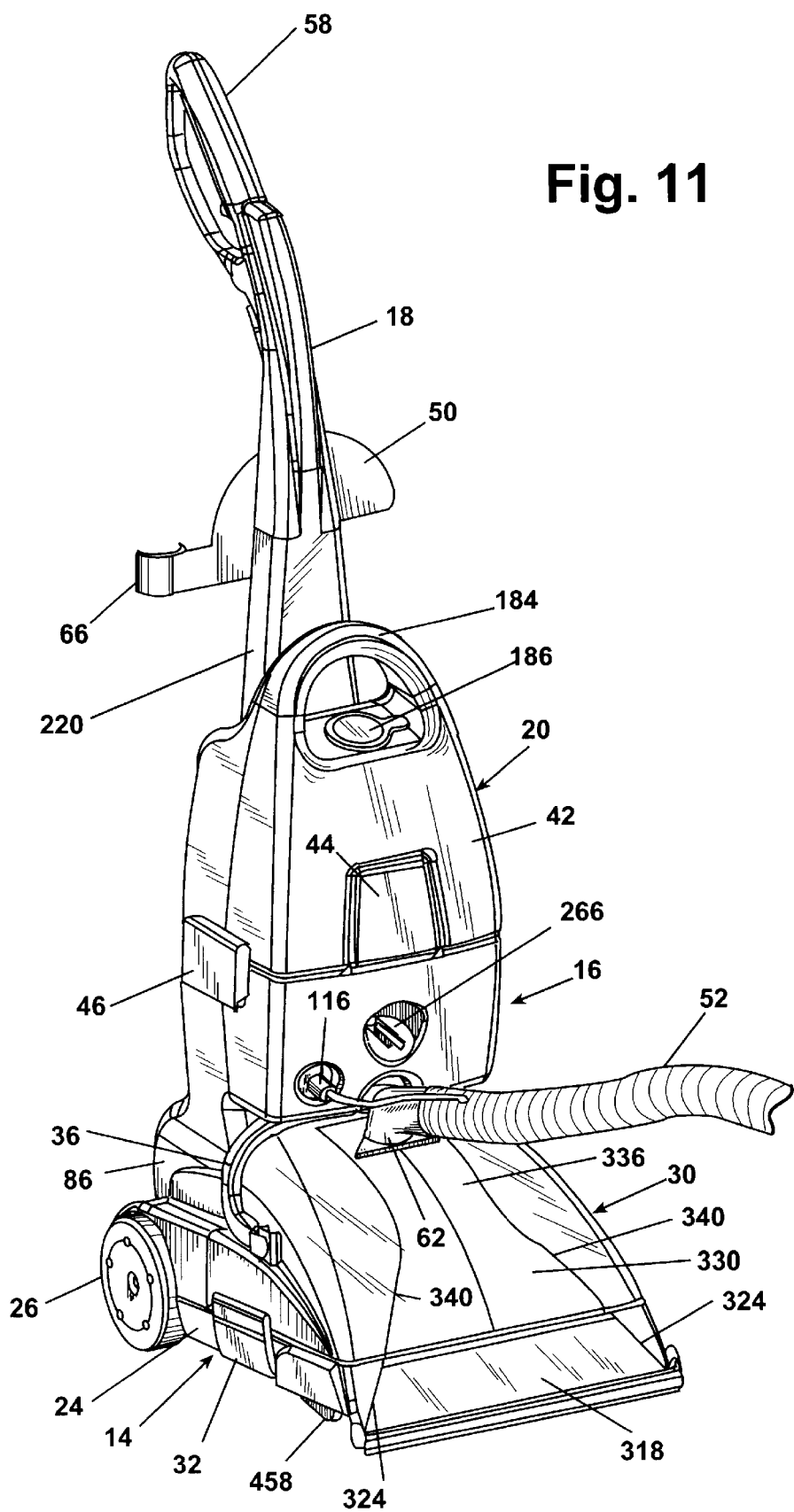
FIG. 11 is a front, perspective view of the upright water extraction cleaning machine of FIG. 1 showing the accessory hose mounted in the operative position.
Figure 12:
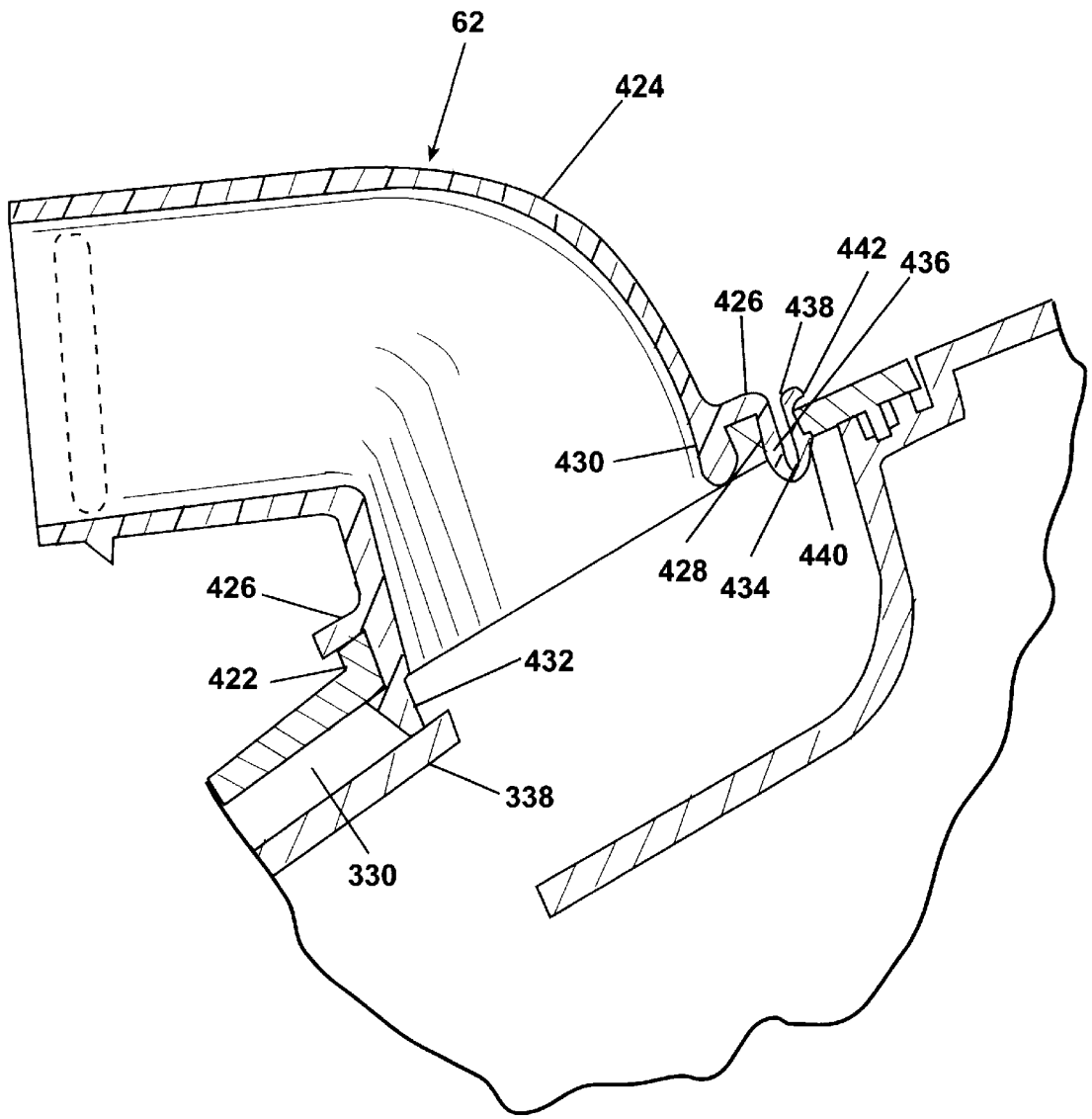
FIG. 12 is a partial, sectional view showing the mounting of the accessory hose to the recovery tank.

As seen in FIGS. 11 and 12, the accessory hose flow aperture is preferably formed immediately above the air/water separator baffle 350 when the cover plate 336 is mounted to the top member 31 of the recovery tank 30. A lock aperture 428 is also formed in the closure plate 336, immediately adjacent the accessory hose flow aperture 422. The accessory hose mounting member 62 comprises a flange 430 which extends downwardly from the triangular support plate 426. The flange 430 is substantially complimentary to the inside edge of the aperture 422 and is adapted to be snugly received therein. A baffle wall 432 extends downwardly along one of the three edges of the triangular flange 422. The baffle 432 extends substantially the entire width of the intermediate working air conduit 330 and extends downwardly a sufficient distance to contact the bottom wall 338 of the conduit effectively seal the intermediate flow conduit 330 from the air/water separator baffle 350 and the vacuum motor 74. Therefore, substantially all of the working air drawn into the recovery tank 30 comes from the accessory hose 52.

The accessory hose mounting member 62 is retained in the aperture 422 by a U-shaped spring arm 434 which is received in and substantially seals the lock aperture 428. The spring arm 434 comprises a pair of opposed legs 436, 438, one of which extends downwardly from the triangular-shaped support plate. A locking barb 440 is provided on the outside edge of the free leg 438 and a projection 442 is provided at the terminal end of the free leg 438. In use, the bight portion of the U-shaped arm 434 is initially inserted into the lock aperture 428. As the spring arm 434 is received in the aperture 428, the locking barb 440 bears against one edge of the aperture 428, thereby causing the free leg 438 to flex inwardly, toward the other leg 436. Eventually, the locking barb 440 will extend past the inside edge of the aperture 428 and the resilient U-shaped spring arm 434 will spring outwardly. The edge of the aperture 428 will be captured between the outer projection 442 and the locking barb 440 of the spring arm 434. When the user desires to remove the accessory hose mounting member 62 from the aperture 422, the user squeezes the free leg 438 toward the inner leg 436 a sufficient distance to bring the locking projection 440 out of contact with the aperture edge. Then, the user lifts the mounting member 62 a sufficient distance to withdraw the spring arm 434, triangular-shaped flange 430 and baffle 432 from the aperture 422. Finally, the user repositions the cap 420 in the aperture 422 thereby effectively sealing the aperture 422.

As seen in FIGS. 9 and 10, the structure of the cap 420 is quite similar to the accessory hose mounting member 62 in that it includes an identical spring arm 446 and substantially complementary triangular flange extending downwardly therefrom. One key distinction is that the cap 420 does not include the downwardly extending baffle wall which seals the intermediate working air flow path 330.

Figure 13:
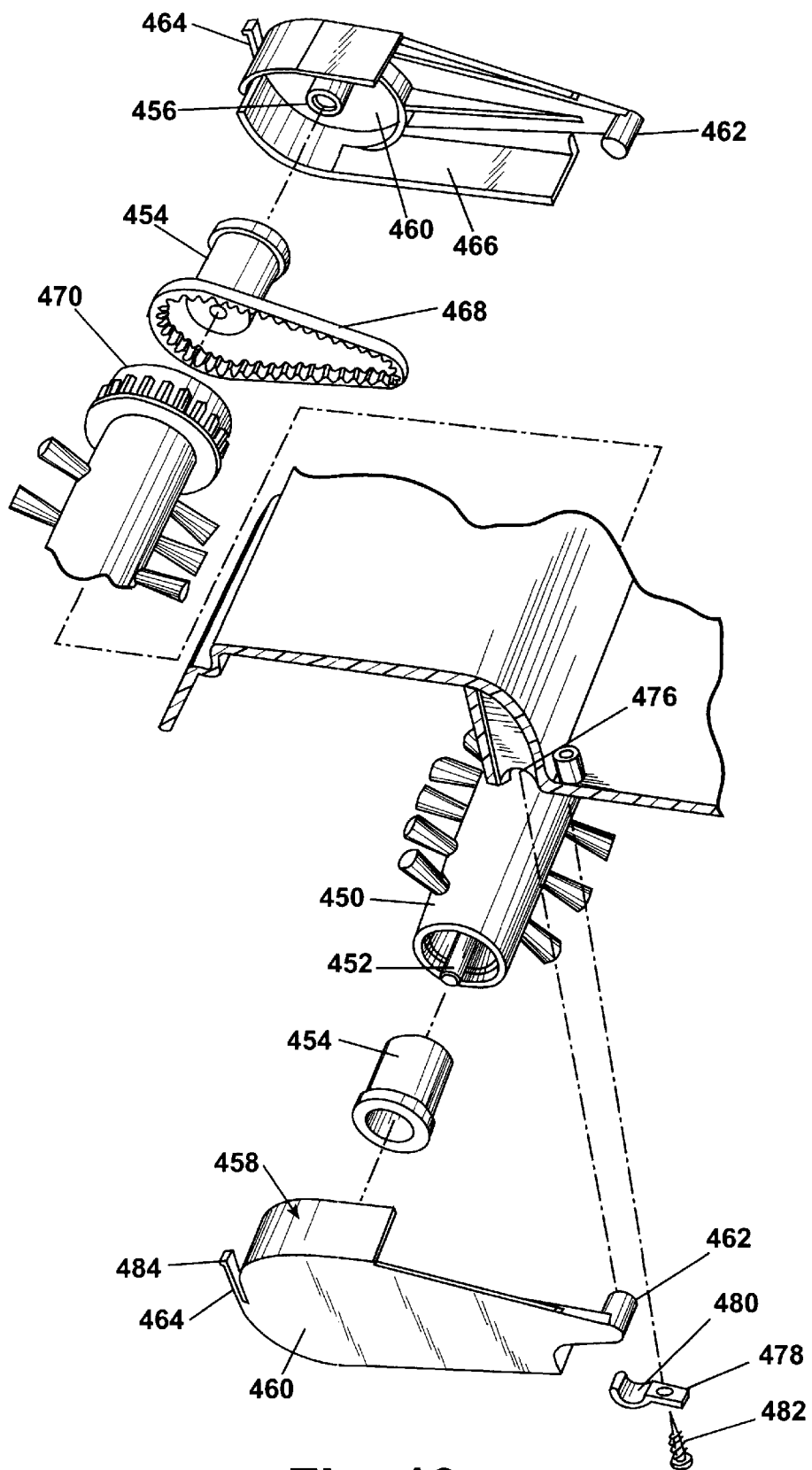
FIG. 13 is a partial, exploded view of the agitation brush assembly and base pan.

The preferred embodiment of the cleaning machine 12 includes a rotatively mounted agitation brush which is adapted for easy and instantaneous vertical adjustment. As seen in FIGS. 9 and 13, the agitation brush assembly comprises a brush dowel 450 fixedly mounted on a shaft 452. The ends of the shaft 452 are received in bearings 454 which in turn are telescopically mounted on inwardly extending bosses 456 provided on a pair of opposed articulating arm members 458. Each arm member 458 comprises a back plate 460 with a pivot pin 462 provided at the rear of the plate 460 and a limit arm 464 provided at the front of the plate 460. In addition, a laterally extending belt guard 466 is preferably integrally formed with the articulating arm 458. The belt guard 466 extends laterally inwardly enough to cover the drive belt 468 in the assembled position. The belt guard 466 protects the belt 468 from threads and other foreign material becoming lodged therein and also protects the carpet or other surface positioned below the base assembly 14 from the rotating belt 468. The drive belt 468 extends around a pulley 470 mounted at one end of the brush dowel 450 and a drive shaft and pulley 472 of the brush motor 474.

The pivot pins 462 of the arm member 458 are captured between a semi-circular shaped bearing surface 476 integrally formed into the bottom of the base pan 24 and a retaining member 478 having a bearing surface 480 formed thereon. The pivot pin 462 is captured between the bearing surfaces 480, 476 of the retaining member 478 and the base pan 24. The retaining member 478 is secured to the base pan 24 by a conventional fastener, such as a screw 482.

The limit arms 464 provided at the front of the retaining members 478 are adapted to limit the downward movement of the brush assembly relative to the base pan 24. Each limit arm 464 has a forwardly extending barb 484 provided at the terminal end of the arm 464. In the operative position, the barb 484 is positioned above a rearwardly extending projection 486 provided on the base pan 24. As seen in FIG. 9, as the agitation brush assembly extends further and further downward, the barb 484 on the end of the limit arm 464 will contact the projection 486 and prevent any further downward movement. With this floating agitation brush assembly, the cleaning machine 12 according to the invention can almost instantaneously adapt to varying carpet naps or other inconsistencies on the surface being cleaned. The brush arms also allow the rotating brush to drop below the normal floor plane to provide contact when a bare floor cleaning attachment raises the suction nozzle opening height from the floor.

Figure 14:
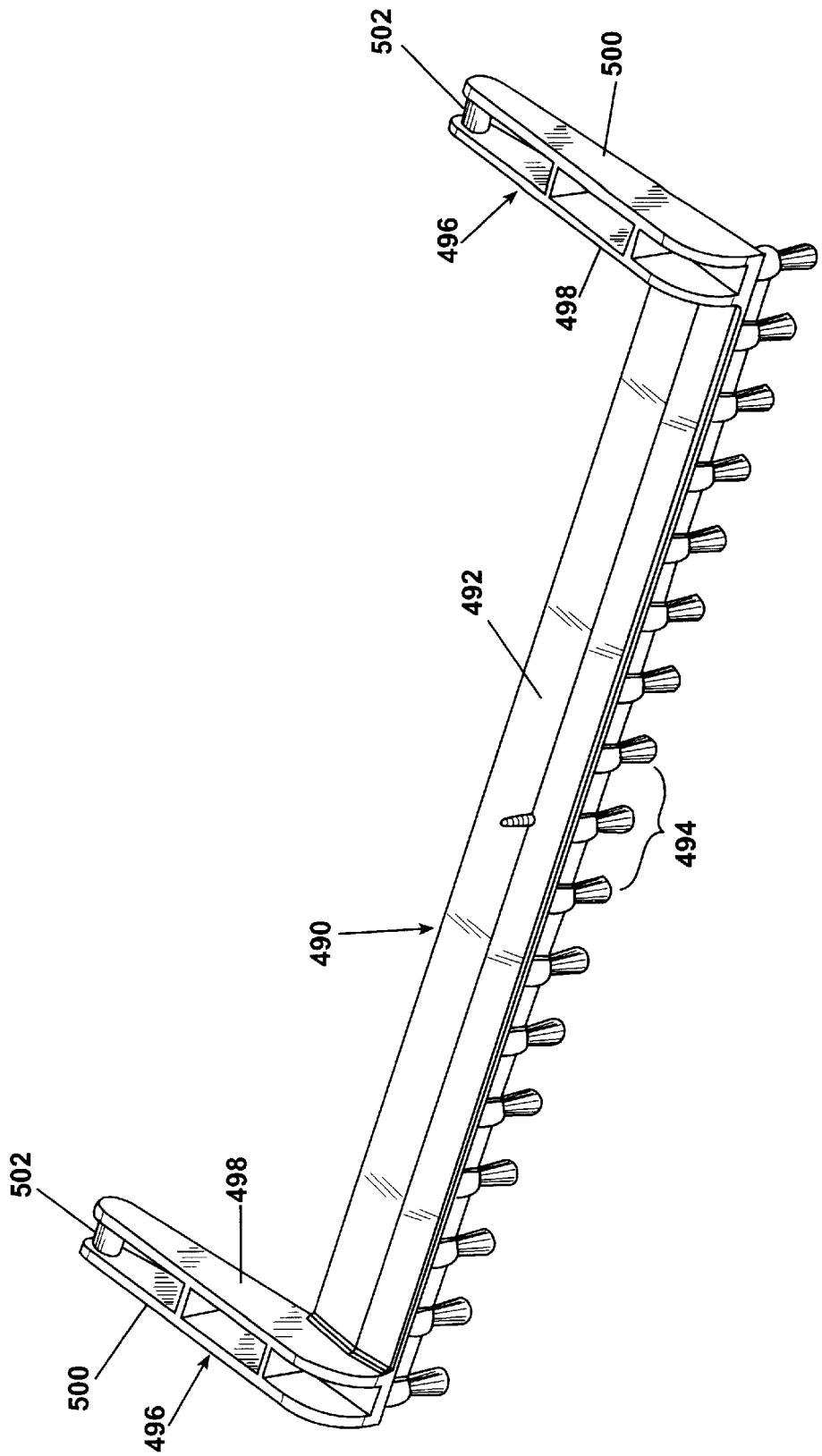
FIG. 14 is a perspective view of an alternative embodiment of the agitation brush of FIG. 13.

An alternative to the floating, rotatably mounted agitation brush as seen in FIGS. 9 and 13, a floating strip agitation brush 490 could be incorporated in the cleaning machine 12 according to the invention, as seen in FIG. 14. The floating strip agitation brush 490 easily adapted for incorporation into the cleaning machine 12 according to the invention. In this embodiment, the strip brush 490 comprises a linear brush body 492 with bristles 494 extending downwardly therefrom and a pair of integrally molded arms. Each of the arms 496 is formed by a pair of opposed plates 498, 500 and a pivot pin 502 extending between the rear most edge of the opposed plates 498, 500. The pivot pins 502 in this embodiment is secured to the base pan 24 in the same manner as shown previously in FIG. 13. Namely, the pivot pins 502 are captured between the bearing surface 476 of the base pan 24 and the bearing surface 480 formed on the retention member 478 which is securely fastened to the base pan 24 by conventional fasteners 482. With this structure, the strip brush 490 can move vertically in response to changes in the carpet nap or other inconsistencies in the surface being cleaned.

Figure 15:
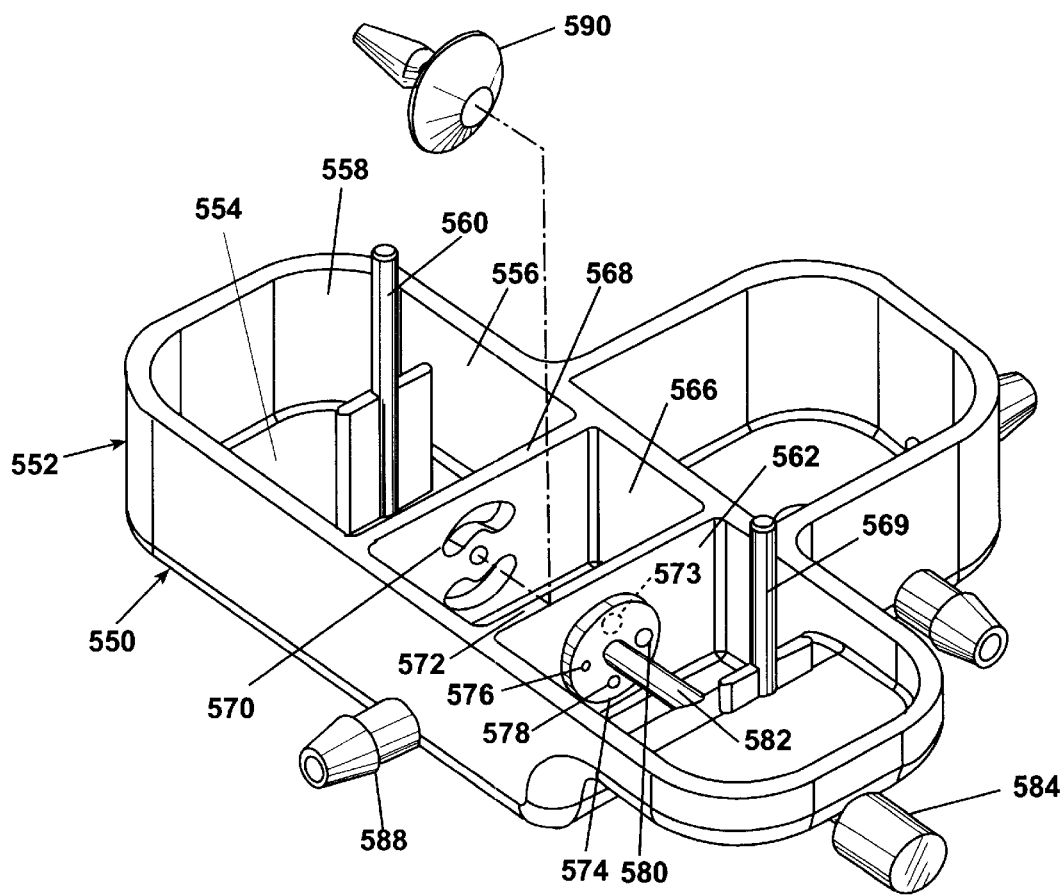
FIG. 15 is a perspective view of a second embodiment of the variable fluid mixing valve mechanism.

A second embodiment of the variable fluid mixing valve mechanism is shown in FIG. 15. Similar to the first embodiment, this mixing valve mechanism 550 receives clean water from the clean water tank 42 and detergent from the detergent tank 44 and mixes these two constituent elements into a cleaning solution for distribution onto the surface to be cleaned and the relative amounts of the constituent elements can be altered depending upon the particular cleaning application.

The second embodiment of the variable fluid mixing valve mechanism 550 comprises a valve housing 552 which is preferably mounted directly to the underside of the top wall of the upper housing 16. The valve housing 552 has multiple chambers provided therein which are defined by a wall of the upper housing 16, the bottom wall 554 of the valve housing, and the exterior side walls 556 of the valve housing 552. A water chamber 558 is defined in the housing 552 immediately below the clean water tank 42 (FIG. 3) by the side walls 558 and an interior wall 568. A stem 560 extends upwardly from the bottom wall 554 of the valve housing, through the water chamber 558 and through the top wall of the upper housing 16. When the clean water tank 42 is placed onto the upper housing 16, the stem 560 extends through the elastomeric cap 140 of the clean water tank 42 to deflect the ball 138 and to open the valve so that water can flow from the tank 42 to the valve housing 552.

A detergent chamber 562 is also defined inside the valve housing 552 by interior wall 572 and side wall 556 and has a stem 564 extending upwardly therefrom. The stem 564 of the detergent chamber 562 extends through the top wall of the upper housing 16 in the same manner as the stem 560 of the water chamber 558 and therefore will not be discussed in detail. When the detergent tank 44 is received on the top wall of the upper housing, the stem 564 extends upwardly through the elastomeric cap 140 of the detergent tank 42 to deflect the ball 138 and open the check valve so that detergent can flow through the valve from the tank 44 to the valve housing 552.

A mixing chamber 566 is defined in the valve housing 552 intermediate the water chamber 558 and the detergent chamber 562 by interior walls 568, 572 and 556. The mixing chamber is separated from the water chamber 558 by wall 568 having at least one aperture 570 provided therein. Similarly, wall 572 having an aperture 573 provided therein separates the mixing chamber 566 from the detergent chamber 562. As water and detergent flow into the respective chambers from the clean water chamber 40 and detergent tank 42, the fluids will flow through the apertures 570, 573 provided in the walls 568, 572 into the mixing chamber 566.

The mixture ratio between the water and detergent is dependent upon the size of the apertures 570, 573. In this embodiment, a disk 574 having three different size apertures 576, 578, 580 is provided immediately adjacent to the aperture 573 in the baffle wall 572. A shaft 582 depends from the central axis of the disk and extends outwardly from the valve housing 552 terminating, at a head 584. The head 584 is mechanically interconnected to the control knob 266 so that there is a direct correlation between the rotation of the control knob 266 and the disc 574. The shaft 582 and disk 574 can be rotated relative to the valve housing 552 by rotation of the control knob to establish differing flow rates of detergent concentrate into the mixing chamber 566. When the small aperture 576 is aligned with the baffle wall aperture 573, a smaller amount of detergent will flow through the aperture 573. This adjustment would be suitable for a light cleaning operation. For a medium or intermediate cleaning operation, the disk 574 and shaft 582 would be rotated so that the intermediate aperture 578 aligns with the baffle wall aperture 573. For even greater levels of concentrate in the mixture, the disk 574 and shaft 582 are rotated until the large aperture 580 is aligned with the baffle wall aperture 573. Still another position would be to rotate the disk 574 so that none of the several aperture 576, 578, 580 are aligned with the baffle wall aperture so that no detergent will enter the mixing chamber, i.e. the clean water rinse position which is shown in FIG. 15. With this structure for the mixing valve, varying the water and detergent concentrate mixing ratios is easily accomplished depending upon the particular cleaning operation.

The back flow of water from the mixing chamber 566 to the clean water chamber 558 is accomplished by mounting conventional umbrella valve 590 in aperture 588 provided in the baffle walls 568. The aperture is dimensioned to receive the shaft of a conventional umbrella valve 590. The umbrella valve member 590 is mounted so that the head is located in the mixing chamber 566 and the shaft extends into the clean water chamber.

The solution pump 112 is mounted adjacent the valve housing 552. The pump inlet is interconnected by a conduit to a fluid outlet provided on the mixing chamber 566. The suction force created by the pump 112 deflects the head of the umbrella valve members 590 so that fluid is drawn from the two chambers 558, 562 into the mixing chamber 566. The pump pressurizes the mixture for distribution to either the accessory hose trigger or the floor spray nozzles as described above.

The water extraction cleaning machine according to the invention overcomes several of the problems of the prior art. Namely, the cleaning machine is easily adapted for a variety of cleaning operations. For example, the detergent to water mixture ratio can be altered nearly instantaneously. In addition, the height of the agitation brush with respect to the suction nozzle opening changes immediately in response to changes in the carpet nap and other inconsistencies in the surface being cleaned. The cleaning machine according the invention also provides easy and convenient means for filling and emptying the clean water and detergent tanks. Similarly, the recovery tank can be quickly and easily removed for emptying or cleaning. Finally, the accessory hose intended for use with the cleaning machine according to the invention is preferably stored on the machine at all times when not in use. This minimizes the storage space required for the machine and accessories and simultaneously ensures the user has all attachments and accessories contained on the machine, regardless of where the machine is being used.

Reasonable variation and modification are possible within the spirit of the foregoing specification and drawings without departing from the scope of the invention.

The embodiments for which an exclusive property or privilege is claimed are defined as follows:

1. A water extraction cleaning machine comprising:
   a housing including an exterior wall accessible to a user;
   a clean water tank mounted to the housing;
   a detergent tank mounted to the housing;
   at least one spray nozzle mounted to the housing for spraying cleaning solution onto the surface being cleaned;
   a suction nozzle adapted to withdraw dirty cleaning solution from the surface being cleaned;
   a vacuum motor mounted to the housing and fluidly connected to the suction nozzle through a working air conduit for removing used cleaning solution from the surface being cleaned;
   a waste water recovery tank fluidly connected to the vacuum motor and to the suction nozzle, the waste water recovery tank having an air/water separator adapted to separate the used cleaning solution and air withdrawn through the nozzle; and
   a variable detergent/water mixing valve comprising:
      a body forming a detergent/water mixing chamber;
      a clean water inlet port in the body fluidly connected to the clean water tank and to the mixing chamber;
      a detergent inlet port in the body fluidly connected to the detergent tank and to the mixing chamber;
      a solution outlet port in the body and fluidly connected to the at least one spray nozzle;
      a variable flow rate valve mounted in the body and movably associated with the clean water port or the detergent inlet port for varying the relative proportions of the clean water and detergent delivered to the solution outlet port; and
   an actuating knob mounted to the housing on the exterior wall for movement about an axis generally perpendicular to the exterior wall and coupled to the variable flow rate valve through a threaded mechanical connection for movement therewith;

wherein the mechanical connection converts rotary motion of the actuating knob to linear movement of the variable flow rate valve.

2. A water extraction cleaning machine according to claim 1 wherein the mechanical connection comprises a threaded shaft connected to the actuating knob for movement therewith and which threadably engages the variable flow rate valve to reciprocate the same as the actuating knob is rotated.

3. A water extraction cleaning machine according to claim 1 wherein the variable flow rate member comprises a shaft with a longitudinal groove formed in the shaft, the groove having a cross section which varies along the length thereof.

4. A water extraction cleaning machine comprising:
a housing including an exterior wall accessible to a user;
a clean water tank mounted to the housing;
a detergent tank mounted to the housing;
at least one spray nozzle mounted to the housing for spraying cleaning solution onto the surface being cleaned;
a suction nozzle adapted to withdraw dirty cleaning solution from the surface being cleaned;
a vacuum motor mounted to the housing and fluidly connected to the suction nozzle through a working air conduit for removing used cleaning solution from the surface being cleaned;
a waste water recovery tank fluidly connected to the vacuum motor and to the suction nozzle, the waste water recovery tank having an air/water separator adapted to separate the used cleaning solution and air withdrawn through the nozzle; and
a variable detergent/water mixing valve comprising:
a body forming a detergent/water mixing chamber;
a clean water inlet port in the body fluidly connected to the clean water tank and to the mixing chamber;
a detergent inlet port in the body fluidly connected to the detergent tank and to the mixing chamber;
a solution outlet port in the body and fluidly connected to the at least one spray nozzle;
a variable flow rate valve mounted in the body and movably positioned in the detergent inlet port for varying the relative proportions of the clean water and detergent delivered to the solution outlet port; and
an actuating knob mounted to the housing on the exterior wall for movement about an axis generally perpendicular to the exterior wall and coupled to the variable flow rate valve through a mechanical connector for movement therewith.

5. The water extraction cleaning machine according to claim 4 wherein the mechanical connector comprises a cam connection.

6. A water extraction cleaning machine according to claim 4 wherein the mechanical connector comprises a cam member having a cam-shaped bearing surface, the cam member is rotatively mounted to the housing for rotation with respect to the variable flow rate valve and is positioned adjacent to thereto so that as the cam member is rotated, the variable flow rate valve bears against the cam-shaped bearing surface, and the position of the variable flow rate valve with respect to the valve housing is altered as a result of the contour of the cam-shaped bearing surface.

7. A water extraction cleaning machine according to claim 3 wherein the groove is tapered along the length thereof.

8. A water extraction cleaning machine according to claim 4 wherein the variable flow rate member comprises a disk rotatably mounted immediately adjacent said one of the detergent and clean water inlet ports, the disk having a plurality of different size flow apertures formed therein and the disk is adapted to be rotated the different size flow apertures can be selectively positioned in register with said one of the clean water and detergent inlet ports.

9. A water extraction cleaning machine according to claim 8 wherein the mechanical connector is a shaft that directly couples the disk to the actuating knob.

10. A water extraction cleaning machine according to claim 9 wherein the disk is mounted adjacent to the detergent inlet port and is adapted to control the flow of detergent through the detergent inlet port to the mixing chamber.

11. A water extraction cleaning machine according to claim 4 and further comprising a pump mounted to the housing and fluidly connected to the solution outlet port in the solution mixing valve body.

12. A water extraction cleaning machine comprising:
a housing including an exterior wall accessible to a user;
a clean water tank mounted to the housing;
a detergent tank mounted to the housing;
at least one spray nozzle mounted to the housing for spraying cleaning solution onto the surface being cleaned;
a suction nozzle adapted to withdraw dirty cleaning solution from the surface being cleaned;
a vacuum motor mounted to the housing and fluidly connected to the suction nozzle through a working air conduit for removing used cleaning solution from the surface being cleaned;
a waste water recovery tank fluidly connected to the vacuum motor and to the suction nozzle, the waste water recovery tank having an air/water separator adapted to separate the used cleaning solution and air withdrawn through the nozzle; and
a variable detergent/water mixing valve comprising:
a body forming a detergent/water mixing chamber;
a clean water inlet port in the body fluidly connected to the clean water tank and to the mixing chamber;
a detergent inlet port in the body fluidly connected to the detergent tank and to the mixing chamber;
a solution outlet port in the body and fluidly connected to the at least one spray nozzle;
a variable flow rate valve mounted in the body and movably associated with the clean water port or the detergent inlet port for varying the relative proportions of the clean water and detergent delivered to the solution outlet port; and
an actuating knob mounted to the housing on the exterior wall for rotational movement and coupled to the variable flow rate valve through a threaded mechanical connector for movement therewith.

13. The water extraction cleaning machine according to claim 12 wherein the variable flow rate valve is positioned in the detergent inlet port.

14. A water extraction cleaning machine according to claim 12 wherein the variable flow rate member comprises a shaft with a groove formed in the shaft, the groove having a cross section which varies along the length thereof.

15. A water extraction cleaning machine according to claim 14 wherein the groove is tapered along the length thereof.

16. A water extraction cleaning machine according to claim 12 wherein the threaded mechanical connector comprises a threaded shaft connected to the actuating knob for movement therewith and which threadably engages the variable flow rate valve to reciprocate the same as the actuating knob is rotated.

17. A water extraction cleaning machine comprising:
   a housing;
   a clean water tank mounted to the housing;
   a detergent tank mounted to the housing;
   at least one spray nozzle mounted to the housing for spraying cleaning solution onto the surface being cleaned;
   a suction nozzle mounted to withdraw dirty cleaning solution from the surface being cleaned;
   a vacuum motor mounted to the housing and connected to the suction nozzle for removing used cleaning solution from the surface being cleaned;
   a waste water tank fluidly connected to the vacuum motor and to the suction nozzle, the waste water tank being adapted to separate the used cleaning solution and air withdrawn through the nozzle; and
   a solution mixing valve fluidly connected to both the clean Water tank and the detergent tank, the mixing valve comprising:
      a valve body forming a mixing chamber having a clean water inlet port fluidly connected to the clean water tank, a detergent inlet port fluidly connected to the detergent tank, and a solution outlet port fluidly connected to the at least one spray nozzle;
      a shaft having a longitudinal variable flow rate groove provided therein, the shaft being mounted in the detergent inlet port for axial movement therein and adapted to control the flow of detergent through the inlet port into the mixing chamber, the flow rate of detergent to the mixing chamber being dependent upon the relative position of the variable flow rate groove within the detergent inlet port.

18. A water extraction cleaning machine according to claim 17 and further comprising an actuator interconnected to the shaft, the actuator being adapted to alter the position of the shaft and the variable flow rate groove within the detergent inlet port.

19. A water extraction cleaning machine according to claim 18 wherein the actuator comprises a cam member having a cam-shaped bearing surface, the cam member being rotatively mounted with respect to the shaft and adjacent to the shaft so that as the cam member is rotated, the shaft bears against the cam-shaped bearing surface, and the position of the shaft with respect to the valve body is altered as a result of the contour of the cam-shaped bearing member.

20. A water extraction cleaning machine according to claim 18 wherein the actuator comprises a threaded shaft which threadably engages the variable flow rate valve to reciprocate the same as the threaded shaft is rotated.

21. A water extraction cleaning machine according to claim 17 and further comprising a pump mounted to the housing and fluidly connected to the solution outlet port in the solution mixing valve housing.

* * * * *